United States Patent
Qiao et al.

(10) Patent No.: US 9,831,812 B2
(45) Date of Patent: Nov. 28, 2017

(54) DIRECT TORQUE CONTROL OF AC ELECTRIC MACHINES

(71) Applicant: NUtech Ventures, Lincoln, NE (US)

(72) Inventors: Wei Qiao, Lincoln, NE (US); Zhe Zhang, Henan (CN); Liyan Qu, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 15/055,289

(22) Filed: Feb. 26, 2016

(65) Prior Publication Data

US 2016/0254771 A1    Sep. 1, 2016

Related U.S. Application Data

(60) Provisional application No. 62/126,355, filed on Feb. 27, 2015.

(51) Int. Cl.
*H02P 21/00* (2016.01)
*H02P 21/30* (2016.01)
(Continued)

(52) U.S. Cl.
CPC ............ *H02P 21/30* (2016.02); *H02P 21/141* (2013.01); *H02P 21/20* (2016.02)

(58) Field of Classification Search
CPC .......... H02J 4/00; H02J 7/1453; H02J 7/1461; H02J 7/1492; H04B 2203/5475;
(Continued)

(56) References Cited

U.S. PATENT DOCUMENTS

| 4,678,248 A | 7/1987 | Depenbrock |
| 4,703,245 A * | 10/1987 | Sakamoto ............ H02P 25/024 |
| | | 318/723 |

(Continued)

FOREIGN PATENT DOCUMENTS

| CN | 101577517 A | * | 11/2009 |
| CN | 103973192 A | * | 8/2014 |
| CN | 104201957 A | * | 12/2014 |

OTHER PUBLICATIONS

Buja and Kazmierlowski, "Direct torque control of PWM inverter fed AC motors—a survey," IEEE Trans. Indus. Electronics, 2004, 51(4):744-757.

(Continued)

*Primary Examiner* — Rita Leykin
(74) *Attorney, Agent, or Firm* — Fish & Richardson P.C.

(57) ABSTRACT

This disclosure features an apparatus including a motor controller to generate control signals to control an electric motor. The motor controller includes a first saturation controller to generate a first saturation controller output based on feedback signals associated with the electric motor. The motor controller further includes a duty ratio modulator coupled to the first saturation controller. The duty ratio modulator is configured to determine activation times for a set of voltage vectors based on the first saturation controller output. The motor controller is configured to generate, at each switching cycle, a control signal based on the set of voltage vectors and the activation times for the set of voltage vectors, and provide the control signal for controlling the electric motor.

91 Claims, 19 Drawing Sheets

(51) Int. Cl.
*H02P 21/20* (2016.01)
*H02P 21/14* (2016.01)

(58) Field of Classification Search
CPC .... H04B 3/548; H02M 5/293; H02P 21/0003;
H02P 21/141; H02P 21/20; H02P 21/30;
H02P 27/06; H02P 21/14; H02P 9/02;
H02P 21/0089; H02P 25/08; H02P 25/22;
F02N 11/04; F02N 2300/104; B60L
15/025; Y02T 10/643; G01L 3/102; G01L
3/105
USPC ..... 318/400.02, 701, 400.17, 798, 805, 812,
318/400.15, 724; 307/1; 363/37, 123,
363/131; 700/286, 90, 296; 703/19, 2;
290/40 F, 40 A, 24, 40 B, 40 C, 40 D;
324/225, 253
See application file for complete search history.

(56) References Cited

U.S. PATENT DOCUMENTS

| | | | | |
|---|---|---|---|---|
| 5,334,923 | A * | 8/1994 | Lorenz | H02P 6/187 318/805 |
| 5,629,597 | A * | 5/1997 | Imanaka | H02P 21/16 318/805 |
| 5,734,249 | A | 3/1998 | Pohjalainen et al. | |
| 5,796,235 | A * | 8/1998 | Schrodl | H02P 6/185 318/400.11 |
| 6,246,197 | B1 * | 6/2001 | Kurishige | B62D 5/046 180/443 |
| 6,713,888 | B2 * | 3/2004 | Kajiura | F02N 11/04 290/40 A |
| 6,806,687 | B2 * | 10/2004 | Kajiura | F02N 11/04 290/40 A |
| 6,809,492 | B2 * | 10/2004 | Harakawa | H02P 21/22 318/603 |
| 7,141,943 | B2 * | 11/2006 | Song | H02P 6/28 318/400.04 |
| 7,155,327 | B2 * | 12/2006 | Hamamoto | B62D 5/0466 180/410 |
| 7,243,006 | B2 * | 7/2007 | Richards | G06F 17/5036 318/801 |
| 7,286,906 | B2 * | 10/2007 | Richards | G06F 17/5036 700/286 |
| 7,304,444 | B2 * | 12/2007 | Takano | B60L 11/1851 180/65.1 |
| 7,564,204 | B2 * | 7/2009 | Ogino | H02P 7/2913 318/400.01 |
| 7,592,785 | B2 * | 9/2009 | Kimura | B60L 15/025 322/28 |
| 7,746,039 | B2 * | 6/2010 | Hoffmann | H02P 21/12 318/800 |
| 8,207,692 | B2 * | 6/2012 | Holmberg | B66D 1/505 114/230.1 |
| 8,436,558 | B2 * | 5/2013 | Holmberg | B66D 1/505 114/213 |
| 8,453,770 | B2 * | 6/2013 | Tang | B60L 15/2036 180/65.1 |
| 8,674,647 | B2 * | 3/2014 | Iwaji | B60L 15/025 318/400.01 |
| 8,737,103 | B2 * | 5/2014 | Kieferndorf | H02M 1/14 363/131 |
| 8,761,985 | B2 * | 6/2014 | Tang | B60L 15/2036 180/65.1 |
| 8,829,831 | B2 * | 9/2014 | Yoo | H02P 21/16 318/400.02 |
| 8,975,841 | B2 * | 3/2015 | Maekawa | H02P 21/14 318/400.02 |
| 9,007,004 | B2 * | 4/2015 | Hunter | H02P 21/0003 318/400.02 |
| 9,059,650 | B2 * | 6/2015 | Huang | H02P 6/165 |
| 9,197,152 | B2 * | 11/2015 | Jebai | H02P 6/185 |
| 9,219,424 | B2 * | 12/2015 | Inomata | H02M 5/293 |
| 9,225,270 | B2 * | 12/2015 | Takahashi | H02P 21/10 |
| 9,281,772 | B2 * | 3/2016 | Wang | H02P 21/141 |
| 9,344,026 | B2 * | 5/2016 | Tang | H02P 21/06 |
| 9,369,080 | B2 * | 6/2016 | Ahmad | H02P 23/14 |
| 9,391,546 | B2 * | 7/2016 | Xia | H02P 6/10 |
| 9,407,189 | B2 * | 8/2016 | Tang | H02P 6/10 |
| 9,431,951 | B2 * | 8/2016 | Tang | H02P 27/06 |
| 9,444,384 | B2 * | 9/2016 | Tang | H02P 21/30 |
| 9,502,905 | B2 * | 11/2016 | Yamaguchi | H02J 4/00 |
| 2001/0007416 | A1 * | 7/2001 | Koide | H02P 6/12 318/701 |
| 2007/0107973 | A1 * | 5/2007 | Jiang | B62D 5/046 180/443 |
| 2011/0231066 | A1 * | 9/2011 | Ohno | B62D 5/046 701/42 |
| 2012/0153881 | A1 * | 6/2012 | Parenti | H02P 21/0089 318/400.02 |
| 2013/0095978 | A1 * | 4/2013 | Sauter | A63B 21/0059 482/4 |
| 2013/0241445 | A1 * | 9/2013 | Tang | B60L 15/2036 318/52 |
| 2014/0203754 | A1 * | 7/2014 | Bhangu | H02P 23/009 318/702 |
| 2015/0032423 | A1 * | 1/2015 | Tang | G06F 17/5009 703/2 |
| 2015/0180398 | A1 * | 6/2015 | Tang | H02P 23/14 318/798 |
| 2015/0236603 | A1 * | 8/2015 | Jimichi | H02M 5/293 363/37 |

OTHER PUBLICATIONS

Casadei et al., "FOC and DTC: Two viable schemes for induction motors torque control," IEEE Trans. Power Electronics, 2002, 17(5):779-787.
Habetler et al., "Direct torque control of induction machines using space vector modulation," IEEE Trans. Industry Applications, 1992, 28(5):1045-1053.
Kenny and Lorenz, "Stator- and rotor-flux-based deadbeat direct torque control of induction machines," IEEE Trans. Industry Applications, 2003, 39(4):1093-1101.
Lee et al., "Deadbeat-direct torque and flux control of interior permanent magnet synchronous machines with discrete time stator current and stator flux linkage observer," IEEE Trans. Industry Applications, 2011, 47(4):1749-1758.
Ren et al., "Direct torque control of permanent-magnet synchronous machine drives with a simple duty ratio regulator." Industrial Electronics, IEEE Transactions on 61.10, 2014, 5249-5258.
Garcia et al., "Comparison Between FOC and DTC Strategies for Permanent Magnet Synchronous Motors," Advances in Electrical and Electronic Engineering, 2006, 76-81.
Habetler et al., "Direct Torque Control of Induction Machines Using Space Vector Modulation," IEEE Transactions on Industry Applications, Sep./Oct. 1992, 28: 1045-1053.
Loncarski, Peak-to-Peak Output Current Ripple Analysis in Multiphase and Multilevel Inverters, Chapter 2: Analysis of the Current Ripple in Three-Phase Two-Level VSIs , 2014, pp. 5-31.
Martins et al., "Switching frequency imposition and ripple reduction in DTC drives by using a multilevel converter," IEEE Trans. Power Electronics, 2002, 17(2):286-297.
Preindl and Bolognani, "Model predictive direct torque control with finite control set for PMSM drive systems, Part 1: maximum torque per ampere operation," IEEE Trans. Industrial Informatics, 2013 9(4):1912-1921.
Tang et al., "A novel direct torque controlled interior permanent magnet synchronous machine drive with low ripple in flux and torque and fixed switching frequency," IEEE Trans. Power Electronics, 2004, 19(2):346-354.
Vas, "Sensorless Vector and Direct Torque Control," New York: Oxford University Press, 1998, pp. 521.
Zhang et al., "Three-Dimensional Space Vector Modulation for Four-Leg Voltage-Source Converters," IEEE Transactions on Power Electronics, May 2002, 17: 314-326.

(56) References Cited

OTHER PUBLICATIONS

Zhong et al., "Analysis of direct torque control in permanent magnet synchronous motor drives," IEEE Trans. Power Electronics, 1997, 12(3):528-536.

* cited by examiner

DIRECT TORQUE CONTROL OF AC ELECTRIC MACHINES

CROSS REFERENCE TO RELATED APPLICATIONS

Pursuant to 35 USC §119(e), this application claims the benefit of prior U.S. Provisional Application 62/126,355, filed on Feb. 27, 2015. The above application is incorporated by reference in its entirety.

FEDERALLY SPONSORED RESEARCH

This invention was made with government support under ECCS-0901218 and ECCS-0954938 awarded by the National Science Foundation. The government has certain rights in the invention.

TECHNICAL FIELD

This invention relates to AC electric machines, and more particularly to direct torque control of AC electric machines.

BACKGROUND

Variable-frequency motor drive systems control motor speed and torque of an electric motor. Such drive systems are widely used in power electronics applications. The drive system implemented depends on characteristics of the application, such as sampling frequency, load requirements, and speed requirements. One technique to control the torque of electric motor drive systems is direct torque control (DTC), which uses a closed-loop control scheme. In contrast to field oriented control (FOC), DTC directly controls the electromagnetic torque and stator flux linkage. In a discrete or digital system, hysteresis thresholds and sampling periods affect the performance of the DTC system.

SUMMARY

In one aspect, an apparatus includes a motor controller to generate control signals to control an electric motor. The motor controller includes a first saturation controller to generate a first saturation controller output based on feedback signals associated with the electric motor. The motor controller further includes a duty ratio modulator coupled to the first saturation controller. The duty ratio modulator is configured to determine activation times for a set of voltage vectors based on the first saturation controller output. The motor controller is configured to generate, at each switching cycle, a control signal based on the set of voltage vectors and the activation times for the set of voltage vectors, and provide the control signal for controlling the electric motor.

In another aspect, a method of controlling an electric motor system includes determining activation times for a set of voltage vectors based on a first saturation controller output. The method further includes generating, at each switching cycle, a control signal to control an electric motor based on the set of voltage vectors and the activation times for the set of voltage vectors.

In a further aspect, an apparatus includes a motor controller to generate control signals to control an electric motor. The motor controller includes a torque and stator flux estimator to estimate, based on a feedback current and a feedback voltage associated with the electric motor, an estimated torque and an estimated stator flux of the electric motor. The motor controller further includes a first saturation controller that receives a torque error representing a difference between the estimated torque and a reference torque and generates a first saturation controller output based on the torque error. The motor controller also includes a second saturation controller that receives a flux error representing a difference between the estimated stator flux and a reference stator flux and generates a second saturation controller output based on the flux error. At each switching cycle, the motor controller generates a control signal based at least on the first saturation controller output, the second saturation controller output, and voltage vectors, and provides the control signal for controlling the electric motor.

In yet another aspect, a method of controlling an electric motor system includes estimating, based on a feedback current and a feedback voltage from an electric motor of the electric motor system, an estimated torque and an estimated stator flux. The method further includes generating a first saturation controller output based on a torque error representing a difference between the estimated torque and a reference torque, and generating a second saturation controller output based on a flux error representing a difference between the estimated stator flux and a reference stator flux. The method also includes generating, at each switching cycle, a control signal to control the electric motor based at least on the first saturation controller output, the second saturation controller output, and voltage vectors to apply to the electric motor.

In a further aspect, an apparatus includes an electric motor and a controller means for generating control signals to control the electric motor. The controller means includes means for estimating, based on a feedback current and a feedback voltage from the electric motor, an estimated torque and an estimated stator flux of the electric motor. The controller means includes means for receiving a torque error representing a difference between the estimated torque and a reference torque, and generating a first saturation controller output based on the torque error. The controller means further includes means for receiving a flux error representing a difference between the estimated stator flux and a reference stator flux, and generating a second saturation controller output based on the flux error. The control signals are generated based at least on the torque error, the flux error, and a table entry selected from a switching table containing information on a plurality of voltage vectors to apply to the electric motor.

Implementations can include one or more of the features described below and herein elsewhere.

In some examples, the apparatus can further include the electric motor. The electric motor can be an alternating current motor.

In some examples, the first saturation controller can be configured to generate the saturation controller output based on a difference between an estimated torque of the electric motor and a reference torque.

In some examples, the duty ratio modulator can be configured to determine the activation times for the set of voltage vectors based on a hysteresis controller output and the saturation controller output.

In some examples, the feedback signals can be representative of a voltage and a current applied to the electric motor.

In some examples, the motor controller can include a switching table containing sets of voltage vectors. The switching table can be configured to select the set of voltage vectors based on the feedback signals. The motor controller can further include a hysteresis controller configured to generate a hysteresis controller output based on the feedback signals. The switching table can be configured to select the set of voltage vectors based on the hysteresis controller output. The apparatus can further include an estimator to estimate a torque of the electric motor and a stator flux of the electric motor based on the feedback signals. The switching table can be configured to select the set of voltage vectors based on a position of the stator flux within a sector of a stationary reference frame.

In some examples, the set of vectors can include at least two active vectors. The set of vectors can include at least one passive vector. The set of vectors can include at least two passive vectors. The duty ratio modulator can be configured to select a first activation time of a first passive vector and a second activation time of a second passive vector based on a predetermined weighting factor.

In some examples, the motor controller can include a second saturation controller to generate a second saturation controller output based on the feedback signals. The duty ratio modulator can be further connected to the second saturation controller. The duty ratio modulator can be configured to determine the activation times for the set of voltage vectors based on the first saturation controller output and the second saturation controller output. The second saturation controller can be configured to generate the second saturation controller output based on a difference between an estimated stator flux of the electric motor and a reference stator flux.

In some examples, the apparatus includes an inverter coupled to the electric motor. The motor controller can be configured to apply the control signal to the inverter to place the inverter in one of a plurality of inverter states. Each inverter state can correspond to one voltage vector among the set of voltage vectors. The inverter can be in each inverter state for a corresponding activation time.

In some examples, the method further includes generating the first saturation controller output based on a difference between an estimated torque of the electric motor and a reference torque.

In some examples, generating the control signal to control the electric motor can include causing an alternating current to be delivered to the electric motor.

In some examples, the method further includes receiving feedback signals indicative of a voltage and a current applied to the electric motor. The method can also include generating the saturation controller output based on the feedback signals. The method can also include selecting the set of voltage vectors from predefined sets of voltage vectors based on the feedback signals. The method can include estimating a torque and a stator flux based on the feedback signals. Selecting the set of voltage vectors can include selecting the set of voltage vectors based on a position of the stator flux within a sector of a stationary reference frame. The method can include generating a hysteresis controller output based on the feedback signals. Selecting the set of voltage vectors can include selecting the set of voltage vectors based on the hysteresis controller output.

In some examples, determining activation times for the set of voltage vectors can include determining a first activation time of a first passive vector and a second activation time of a second passive vector based on a predetermined weighting factor.

In some examples, determining the activation times can include determining the activation times for the set of voltage vectors based on the first saturation controller output and a second saturation controller output. The method can further include generating the second saturation controller output based on a difference between an estimated stator flux of the electric motor and a reference stator flux.

In some examples, the method can further include applying the control signal to an inverter to place the inverter in one of a plurality of inverter states. Each inverter state can correspond to one voltage vector among the set of voltage vectors. The inverter can be in each inverter state for a corresponding activation time.

In some examples, the voltage vectors or the set of voltage vectors can include a zero voltage vector and two or more active voltage vectors. The voltage vectors or the set of voltage vectors can include two or more zero voltage vectors.

In some examples, the motor controller can modulate an output voltage based on a duty ratio vector. The method can include modulating an output voltage based on a duty ratio vector. The duty ratio vector can be a linear combination of the zero voltage vector and the active voltage vectors. Coefficients of the linear combination can be determined from the first saturation controller output and the second saturation controller output. Elements of the duty ratio vector can correspond to activation times of the zero voltage vector and the active voltage vectors.

In some examples, the motor controller can include a torque comparator that receives the torque error and generates a torque comparator output. The method can include generating a torque comparator output based on the torque error, the torque comparator output having a low state and a high state. The torque comparator output can have a low state or a high state. If the torque comparator output has the low value, the voltage vectors can be configured to cause the torque of the electric motor to be decreased. If the torque comparator output has the high value, the voltage vectors can be configured to cause the torque of the electric motor to be increased. In some cases, the motor controller can be configured to select a table entry from a table based on the torque comparator output. The method can include selecting a table entry from a table based on the torque comparator output. The table can have two or more table entries each having a set of voltage vectors. At least one of the table entries can correspond to the voltage vectors. The estimated stator flux can be located within a sector of a stationary reference frame. In some cases, the motor controller can select the table entry based on the sector within which the estimated stator flux is located. The method can include selecting the table entry based on a sector of a stationary reference frame within which the estimated stator flux is located. The stationary reference frame can include six sectors defined by the plurality of voltage vectors. The motor controller can select the table entry from one of twelve available table entries.

In some examples, the first saturation controller output can increase linearly from a low value to a high value as the torque error increases. The first saturation controller output can be normalized such that the low value is zero and the high value is one.

In some examples, the second saturation controller output can linearly increase from a low value to a high value as the stator flux error increases. The second saturation controller output can be normalized such that the low value is zero and the high value is one.

In some examples, the motor controller can deliver the control signals to an inverter operable with the electric motor.

In some examples, a low value of the first saturation controller output can be determined based on a rotor speed of the electric motor.

In some examples, a low value of the second saturation controller output can be set such that a magnitude of the estimated stator flux is substantially constant.

In some examples, an electric vehicle includes the electric motor and the motor controller. The method can include controlling the electric motor to control a speed or acceleration of the electric vehicle.

In some examples, an industrial motor drive system can include the electric motor and the motor controller.

In some examples, the method can include generating a torque comparator output based on the torque error. The torque comparator output can have a low state and a high state.

In some examples, the method can include delivering the control signals to an inverter operable with the electric motor.

Implementations can include one or more of the advantages described below and herein. The motor controller may facilitate fast dynamic response for the electric motor at a low computational cost for the motor controller. The apparatus can further control the electric motor at low sampling frequencies while persevering waveform fidelity of the torque and the stator flux of the electric motor. For example, the controller can have low sampling frequencies below 10,000 samples/second while maintaining reduced steady-state tracking error for both the torque and the stator flux of the electric motor as compared to conventional DTC systems. As a result, low-cost controllers having low sampling frequencies can be used while still achieving (i) good system performance in both transient and steady states and (ii) low computational cost.

The motor controller may also provide multiple different pulse width modulation (PWM) control schemes that can be implemented in a wide variety applications. The motor controller can implement a specific PWM control scheme that can be tailored so as to reduce the torque and stator flux ripples in a particular application.

One or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
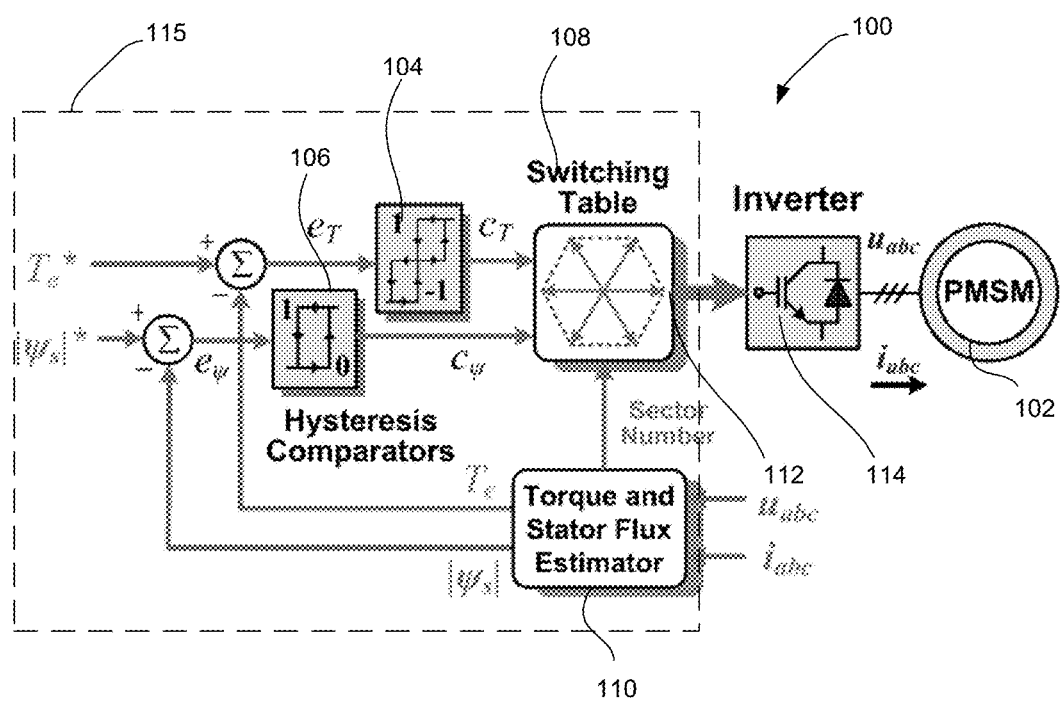
FIG. 1A is a diagram of a hysteresis controller-based DTC drive system.

A saturation controller-based direct torque control (DTC) system can reduce the torque and stator flux ripples for electric motors, such as, for example, permanent-magnet synchronous motor (PMSM) drives, using a relatively low sampling frequency (e.g., below 10,000 samples/second). The DTC system can include an electric motor coupled to an inverter that receives alternating current (AC) from the inverter. The inverter is connected to a motor controller that implements a control scheme to determine a switching state of the inverter. In control of a multiphase, multilevel inverter, available switching states of the inverter can be represented as voltage vectors in which each entry of the voltage vector corresponds to a state of each phase of the inverter. For example, in a three-phase, two-level inverter, each entry of the voltage vector can correspond to selection of one of the two levels (e.g., first and second levels) for a particular phase. A voltage vector V(1,1,0), for instance, corresponds to activation of a second level of phase a, a second level of phase b, and a first level of phase c. The motor controller can operate at a switching frequency in which the motor controller sends a control signal to the inverter at a rate corresponding to the switching frequency. The motor can generate the control signal such that the control signal corresponds to specific voltage vectors to be applied during a switching period.

Nonlinear adaptive saturation controllers can be implemented into the DTC system to control the inverter. The motor controller, for example, can include a switching table that, in combination with saturation controllers, generates control signals that correspond to a selected set of voltage vectors. Each voltage vector of the set of voltage vectors can be activated for a predetermined activation time to enable delivery of AC having a desired frequency, amplitude, and phase to the motor. The activation times of the voltage vectors can be determined based on the outputs of the saturation controllers. For example, a duty ratio modulator can compute the duty ratios for each of the voltage vectors such that each selected voltage vector has an assigned on-time or activation time in the switching cycle. In this regard, for each switching cycle, the inverter is placed in multiple inverter states corresponding to the voltage vectors. Each inverter state corresponds to one of the voltage vectors, and within the switching cycle, the inverter is in each inverter state for the corresponding assigned activation time.

The examples of saturation controller-based DTC systems described herein can significantly reduce the steady-state torque and flux ripples of PMSMs and other electric motors. These DTC systems can also control the electric motors with fast dynamics, robustness to disturbances, and low computational cost. The saturation controller-based DTC systems can further reduce steady-state torque tracking error at low sampling frequencies.

Hysteresis Controller-Based DTC System

FIG. 1A shows an example of a hysteresis-controller based DTC system 100 that controls a permanent-magnet synchronous motor (PMSM) 102. The DTC system 100 includes a motor controller 115 that, at a switching cycle, delivers a control signal 112 to an inverter 114, which converts DC to AC that powers the motor 102. The inverter 114 is coupled to a DC source and includes circuitry that enables DC current from the DC source to be converted to AC. In some examples, the inverter 114 is a two-level, three-phase inverter. In such examples, the control signal 112 delivered to the inverter 114 causes the inverter 114 to be placed in a sequence of one or more inverter states. For each inverter state, the control signal 112 activates a combination of switches of the inverter 114 to specify the level for each of the three phases. If the inverter 114 is a two-level, three-phase inverter, the inverter 114 includes eight possible switching states, including two passive switching states in which current is not delivered through each of the three phases. In the six active switching states, the inverter 114 is configured such that the DC source is able to deliver an AC output having a current $i_{abc}$ and voltage $u_{abc}$ to the motor 102. In the two passive switching states, the current $i_{abc}$ and voltage $u_{abc}$ are zero. The current $i_{abc}$ and the voltage $u_{abc}$ can vary in phase, amplitude, and frequency depending on the switching state of the inverter 114, e.g., depending on which of the combination of the switches of the inverter 114 are activated.

The motor controller 115 generates several control signals 112 during operation of the electric motor 102. To generate a control signal 112 for a single switching cycle, the motor controller 115 can respond to feedback signals using two hysteresis controllers 104 and 106, a switching table 108, and an estimator 110. The estimator 110 of the motor controller 115 receives a feedback voltage $u_{abc}$ and a feedback current $i_{abc}$ which correspond to the voltage and current delivered to the motor 102—and uses those feedback values to estimate an electromagnetic torque $T_e$ and a stator flux $\psi_s$. The estimator 110 implements, for example, a state observer system or a state-space model to generate the estimated electromagnetic torque $T_e$ and the estimated stator flux $\psi_s$.

The motor controller 115 uses the estimated electromagnetic torque $T_e$ and the stator flux $\psi_s$ directly as feedback signals for operation of the torque hysteresis controller 104 and the stator flux hysteresis controller 106. The torque hysteresis controller 104 transforms a torque error $e_T$ (the difference between the estimated torque $T_e$ and a reference torque $T_e^*$) into an torque comparator output $c_T$. The stator flux hysteresis controller 106 transforms a stator flux error $e_\psi$ (the difference between a magnitude of the estimated stator flux $|\psi_s|$ and a magnitude of a reference stator flux $|\psi_s|^*$) into a stator flux comparator output $c_\psi$. Each of the hysteresis controllers 104 and 106 outputs two discrete states: a low state and a high state. For example, the hysteresis controllers 104 and 106 can output the discrete states 0 or 1 for the torque comparator output $c_T$ and the stator flux comparator output $c_\psi$, respectively.

Figure 1B:
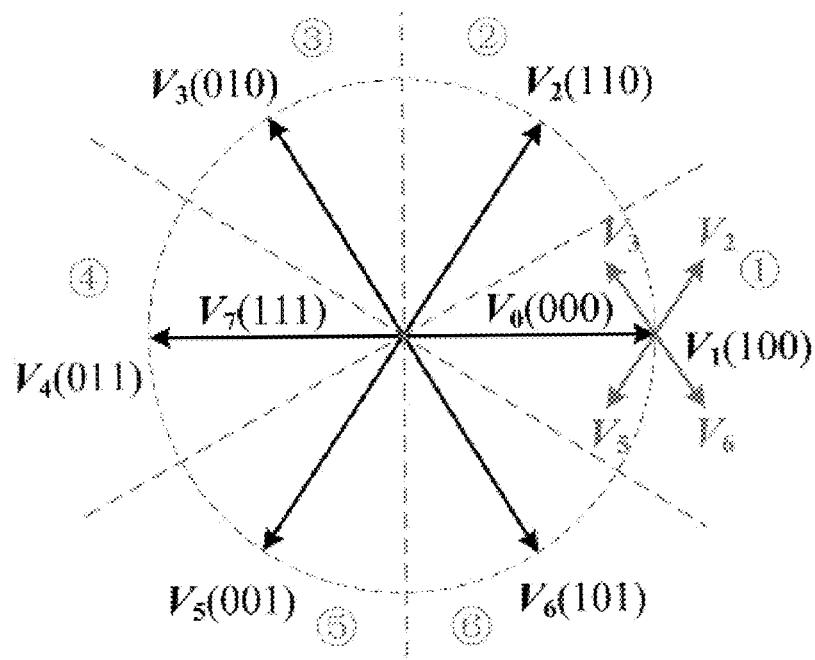
FIG. 1B is a diagram of inverter voltage vectors of an inverter of the hysteresis controller-based DTC drive system of FIG. 1A.

In examples in which the inverter 114 is a three-phase two-level inverter, the inverter 114 (shown in FIG. 1A) controls the motor 102 using eight inverter voltage vectors $V_0$ through $V_7$ corresponding to the eight available switching states of the inverter 114. FIG. 1B shows a 2D spatial placement of the inverter voltage vectors $V_0$ through $V_7$ within an $\alpha\beta$ reference frame, which is a stationary reference frame generated using an $\alpha\beta$ transformation. The $\alpha\beta$ reference frame is divided into six equally-sized sectors. The vectors $V_0$ through $V_7$ define sectors 1 through 6 of the $\alpha\beta$ reference frame. Each active vector $V_1$ through $V_6$ bisects the sector having the same numerical label. In other words, the angle between one active vector (e.g., $V_1$) and the boundary of the sector containing the active vector (e.g., Sector 1) is 30 degrees. The estimator 110 determines the position of the estimated stator flux $\psi_s$ within the $\alpha\beta$ reference frame and selects one of the sectors 1 through 6 based on that position.

Referring back to FIG. 1A, the switching table 108 receives the sector number and the hysteresis outputs $c_T$ and $c_\psi$ and selects an optimal voltage vector from among the inverter voltage vectors $V_0$ through $V_7$ based on the sector number and the hysteresis outputs $c_T$ and $c_\psi$. In a switching cycle, the motor controller 115 then delivers to the inverter 114 the control signal 112 corresponding to the selection from the switching table 108. The control signal 112 controls the inverter 114, in turn controlling the motor 102 to minimize the torque error $e_T$ and flux error $e_\psi$. An example of the switching table 108 for a three-level torque hysteresis controller-based DTC system 100 is given in TABLE 1 below.

TABLE 1

Switching Table 108 for the DTC System 100

| | | Sector | | | | | |
|---|---|---|---|---|---|---|---|
| | | 1 | 2 | 3 | 4 | 5 | 6 |
| $c_\psi =$ 1 | $c_T = 1$ | $V_2$(110) | $V_3$(010) | $V_4$(011) | $V_5$(001) | $V_6$(101) | $V_1$(100) |
| | $c_T = 0$ | $V_7$(111) | $V_0$(000) | $V_7$(111) | $V_0$(000) | $V_7$(111) | $V_0$(000) |
| | $c_T = -1$ | $V_6$(101) | $V_1$(100) | $V_2$(110) | $V_3$(010) | $V_4$(011) | $V_5$(001) |
| $c_\psi =$ 0 | $c_T = 1$ | $V_3$(010) | $V_4$(011) | $V_5$(001) | $V_6$(101) | $V_1$(100) | $V_2$(110) |
| | $c_T = 0$ | $V_0$(000) | $V_7$(111) | $V_0$(000) | $V_7$(111) | $V_0$(000) | $V_7$(111) |
| | $c_T = -1$ | $V_5$(001) | $V_6$(101) | $V_1$(100) | $V_2$(110) | $V_3$(010) | $V_4$(011) |

TABLE 1 shows thirty-six table entries that can be selected based on the sector number, the torque hysteresis output $c_T$, and the flux hysteresis output $c_\psi$. Because the torque hysteresis controller 104 outputs a two-level torque comparator output $c_T$, and the and the stator flux hysteresis controller 106 outputs a three-level stator flux comparator output $c_\psi$, the torque comparator output $c_T$ and the stator flux comparator output $c_\psi$ provide six distinct combinations of comparator output levels. Each of these distinct combinations can correspond to one of the six available vectors when the stator flux linkage $\psi_s$ is in a given sector.

By way of example, as shown in TABLE 1, when the stator flux linkage $\psi_s$ is positioned in sector 1, one of six voltage vectors can be selected: $V_0$, $V_2$, $V_3$, $V_5$, $V_6$, and $V_7$. Among these vectors, four inverter vectors $V_2$, $V_3$, $V_5$, $V_6$ are active vectors, and two inverter vectors $V_0$ and $V_7$ are passive vectors. The inverter voltage vectors $V_0$ and $V_7$ are zero vectors in which, when applied, the inverter 114 delivers zero voltage and current. Referring to FIG. 1B, the four active inverter vectors $V_2$, $V_3$, $V_5$, $V_6$ that can be selected when the stator flux linkage $\psi_s$ is in sector 1 are shown. When the stator flux falls in sector 1, the application of the inverter vectors $V_0$, $V_2$, $V_3$, $V_5$, $V_6$, and $V_7$, i.e., placing the inverter 114 in the switching state corresponding to one of the inverter vectors, can have the following effects (assuming that the rotor is rotating anti-clockwise):

- $V_2(110)$ will increase both the torque $T_e$ and the stator flux amplitude $|\psi_s|$.
- $V_5(001)$ will decrease both the torque $T_e$ and the stator flux amplitude $|\psi_s|$.
- $V_3(010)$ will increase the torque $T_e$ and decrease the stator flux amplitude $|\psi_s|$.
- $V_6(101)$ will decrease the torque $T_e$ and increase the stator flux amplitude $|\psi_s|$.
- Zero voltage vectors $V_0(000)$ and $V_7(111)$ will stop the stator flux $\psi_s$ from moving, keep the stator flux amplitude $|\psi_s|$ constant, and decrease the electromagnetic torque $T_e$ (but not to the degree with which the torque $T_e$ will decrease with application of the active inverter vectors $V_5(001)$ and $V_6(101)$).

If the rotor is rotating clockwise, the above-described effects will be opposite when applying the same voltage vector. Similarly, if the stator flux linkage $\psi_s$ is located in another sector (e.g., one of sectors 2-6), the switching table selects from six inverter voltage vectors, four of which are active vectors and two of which are passive vectors.

In the DTC system 100 of FIG. 1A, when the stator flux linkage $\psi_s$ is positioned in a given sector, the switching table 108 chooses a voltage vector from among the four active voltage vectors (i.e., the six non-zero voltage vectors) such that the trajectory of the stator flux $\psi_s$ is circular, though it is possible to choose from the zero vectors $V_0$ and $V_7$ if it is determined that there is no torque error $c_T$. Each non-zero voltage vector $V_1$ through $V_6$ will either increase or decrease the torque $T_e$ or stator flux magnitude $|\psi_s|$. As shown in TABLE 1 above, the switching table 108 selects one of the vectors based on the torque comparator output $c_T$ and the stator flux comparator output $c_\psi$, which are indicators of whether the torque $T_e$ and stator flux magnitude $|\psi_s|$, respectively, need to be increased or decreased to cause the torque $T_e$ and stator flux magnitude $|\psi_s|$ to tend toward the reference values.

In some examples, the motor controller 115 applies the selected voltage vector for the entire duration of time between receiving samples of the voltage $v_{abc}$ and the current $i_{abc}$, e.g., the switching period. Upon receiving a subsequent sample, the switching table 108 can determine whether a new voltage vector should be applied based on the outputs of the hysteresis controllers 104, 106 and the estimator 110. In some implementations, the motor controller 115 applies the selected voltage vector for a predetermined duration of time less than the sampling period. After the voltage vector is applied during the switching period, the motor controller 115 can apply a passive voltage vector for the remaining duration of time before receiving a subsequent sample. The switching period can be pre-selected based on, for example, the sampling period and/or the particular type of the electric motor to be controlled.

Analysis of DTC

In some implementations of a PMSM, the electromagnetic torque $T_e$ can be expressed in terms of the amplitudes of the stator flux linkage $\psi_s$ and rotor flux linkage $\psi_m$, as shown in equation (1) below:

$$T_e = \frac{3}{4}\frac{p|\psi_s|}{L_d L_q}[2\psi_m L_q \sin\delta - |\psi_s|(L_q - L_d)\sin(2\delta)] \tag{1}$$

$L_q$ and $L_d$ are the quadrature-axis (q-axis) and the direct axis (d-axis) inductances of the PMSM, respectively; $\psi_m$ is the rotor flux linkage generated by the permanent magnets of the PMSM; $|\psi_s|$ is the stator flux linkage magnitude; $\delta$ is the torque angle; and p is the number of pole pairs.

Taking the derivative of equation (1) with respect to time yields $$\frac{dT_e}{dt} = A \times \frac{d|\psi_s|}{dt} + B \times \frac{d\delta}{dt} \text{ where} \tag{2}$$

$$A = \frac{3}{2}\frac{p}{L_d}\left[\psi_m \sin\delta - \frac{L_q - L_d}{L_q}|\psi_s|\sin 2\delta\right], \text{ and} \tag{3}$$

$$B = \frac{3}{2}\frac{p}{L_d}\left[\psi_m |\psi_s|\cos\delta - \frac{L_q - L_d}{L_q}|\psi_s|^2 \cos 2\delta\right]. \tag{4}$$

After discretization of the stator flux linkage $\psi_s$ and rotor flux linkage $\psi_m$, the torque variation between two sampling intervals can be expressed as:

$$\Delta T_e = \frac{3}{2}\frac{p}{L_d}\left[\psi_m \sin\delta_0 - \frac{L_q - L_d}{L_q}|\psi_s|_0 \sin 2\delta_0\right] \times \Delta|\psi_s| + \tag{5}$$
$$\frac{3}{2}\frac{p}{L_d}\left[\psi_m |\psi_s|_0 \cos\delta_0 - \frac{L_q - L_d}{L_q}|\psi_s|_0^2 \cos 2\delta_0\right] \times \Delta\delta$$

where $|\psi_s|_0$ and $\delta_0$ are the stator flux magnitude and the torque angle at the reference point, respectively. Equations (2)-(5) demonstrate that the operating mode (related to $|\psi_s|_0$) and loading condition (related to $\delta_0$) will affect the weights of flux and torque angle changes on electromagnetic torque ripples.

Neglecting the voltage drop caused by the stator resistance, the relationship between the stator voltage vector $u_s$ and the change of stator flux vector $\Delta\psi_s$ can be expressed as $$\Delta\psi_s = u_s T_s \tag{6}$$

where $T_s$ is the sampling time. The sampling time corresponds to the amount of time between samples received by a motor controller. The samples can correspond to data representative of the electromagnetic torque $T_e$ of the motor and the stator flux linkage $\psi_s$, such as, for example, the voltage $u_{abc}$ and the current $i_{abc}$ delivered to the motor. The change of the torque angle can be evaluated by $$\Delta\delta = \Delta\theta_{VT} - \omega_e T_s \tag{7}$$

where $\Delta\theta_{(VT)}$ is the change of stator flux angle when a voltage vector $V_i$ (i=0, . . . , 7) is applied for the period of $T_s$, and $\omega_e$ is the electrical rotor speed.

Figure 1C:
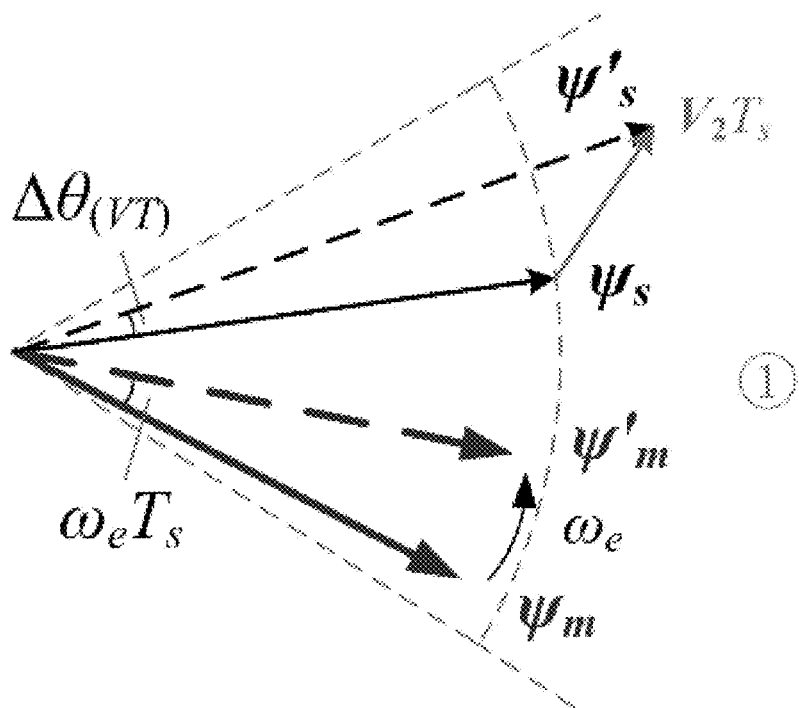
FIG. 1C is a diagram of an exemplary stator flux vector positioned within a sector defined by the inverter voltage vectors of FIG. 1B.

FIG. 1C illustrates the effect of the voltage vector $V_2$ on the stator flux $\psi_s$ and the spatial relationships of the quantities in equation (7), assuming that the stator flux $\psi_s$ lies in the sector 1. In FIG. 1C, $\psi_s$ and $\psi_m$ represent the initial stator and rotor flux vectors, respectively. $\psi'_s$ and $\psi'_m$ are the stator and rotor flux vectors at the end of the period of $T_s$ with $V_2$ being applied.

Assuming that a switching period $T_s$ (corresponding to how often the switching table switches from one vector to another vector for a hysteresis controller-based DTC system) is infinitesimal, the change of the stator flux angle caused by the voltage vector is approximately proportional to $T_s$. Therefore, according to equations (5)-(7), both the torque and the stator flux changes are approximately proportional to the sampling period.

In the DTC system described above, the voltage vectors can be executed in the entire switching cycle, which can cause torque and flux ripples. The ripples can be even larger when the switching frequency is lower because the switching period $T_s$ increases.

Equations (1)-(7) also can demonstrate the effects of zero voltage vectors on the load angle, particularly the change in the load angle M. Since the use of zero voltage vectors $V_0(000)$ and/or $V_7(111)$ will not change the position or magnitude of the stator flux vector, $\Delta\theta_{VT}$ can be assumed to be zero such that the torque variation is only related to the load angle variation. Thus, according to equation (7), when using zero voltage vectors, the change of the load angle is proportional to the switching period, i.e., equation (7) can be simplified to $\Delta\delta=-\omega_e T_s$. Therefore, the torque variation is proportional to the switching period. Different selection schemes for zero vectors can be implemented to produce different switching periods that reduce torque variation.

Saturation Controller-Based DTC System

Figure 2A:
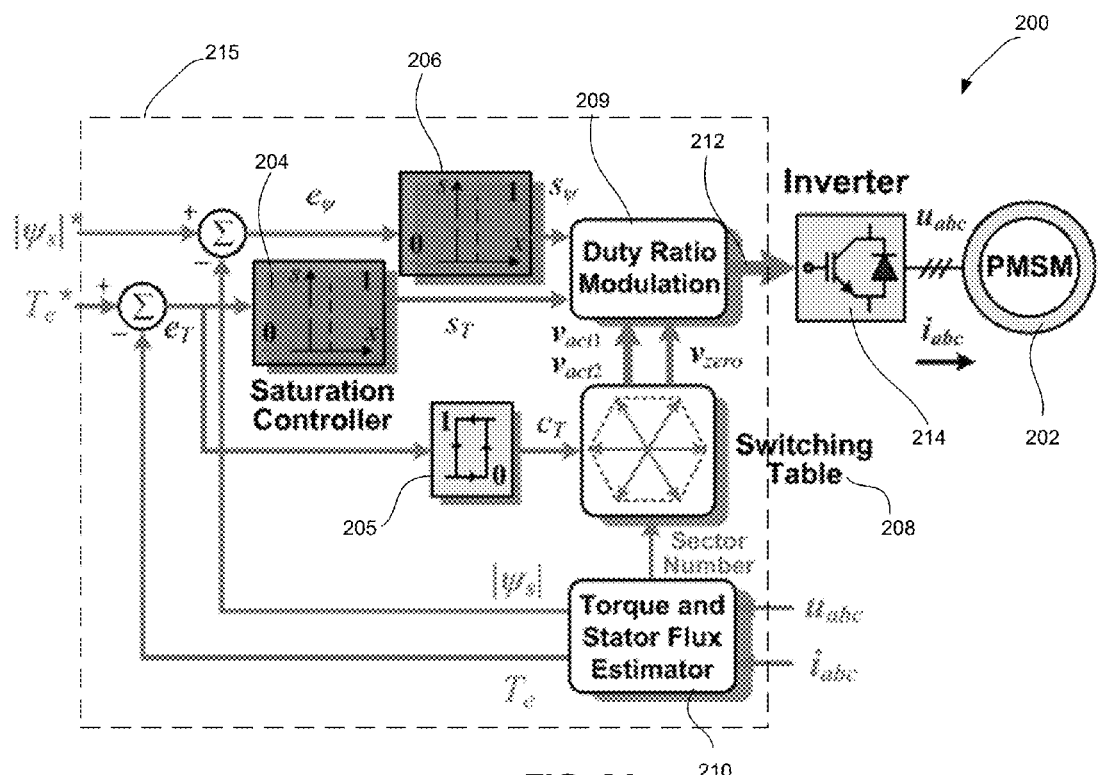
FIG. 2A is diagram of a saturation controller-based DTC drive system.

Based on the above analysis of the torque and stator flux ripples of the DTC system 100, the DTC system 100 of FIG. 1A can be modified to reduce the torque and flux ripples when the sampling frequency is low by modulating the duration of the active voltage vectors within one switching cycle. In some examples, the DTC system can include a saturation controller to improve the steady state errors of the torque and the stator flux of the electric motor. A schematic diagram of a saturation controller-based DTC system 200 is shown in FIG. 2A. Similar to the DTC system 100 depicted in FIG. 1A, the DTC system 200 includes a motor controller 215 that generates control signals to control an inverter 214 that operates a motor 202.

The motor controller 215 includes a switching table 208 and an estimator 210. Instead of using the hysteresis controllers 104 and 106 as implemented in the DTC system 100 to determine the voltage vector to apply to the inverter 214, the DTC system 200 uses saturation controllers 204 and 206 that provide outputs used to determine activation times of multiple voltage vectors to apply to the inverter 214 in a switching cycle. The DTC system 200 additionally includes a torque comparator 205 and a duty ratio modulator 209. The DTC system 200 delivers control signals 212 to an inverter 214, which converts DC to AC. The inverter 214 can receive DC from a DC source (not shown), and then in turn delivers voltage $u_{abc}$ and current $i_{abc}$ to the motor 202. The DTC system 200 delivers a single control signal 212 to the inverter 214 at the start of a switching cycle.

The estimator 210 receives a feedback voltage $u_{abc}$ and a feedback current $i_{abc}$, which correspond to the voltage and current delivered to the motor 202. The feedback voltage $u_{abc}$ and the feedback current $i_{abc}$ are feedback signals usable by the motor controller 215 to determine the operations of the motor 202. For example, the motor controller 215 uses these values to estimate an electromagnetic torque $T_e$ and a stator flux $\psi_s$ of the motor 202. The estimated electromagnetic torque $T_e$ and the estimated stator flux $\psi_s$ can then be used as feedback signals that are compared to reference values for the torque and the stator flux. The estimator 210 implements, for example, a state observer system or a state-space model to generate the estimated electromagnetic torque $T_e$ and the estimated stator flux $\psi_s$.

The torque saturation controller 204 then transforms a torque error $e_T$ (the difference between the estimated torque $T_e$ and a reference torque $T_e^*$) into a torque saturation controller output $s_T$. The stator flux saturation controller 206 transforms a stator flux error $e_\psi$ (the difference between a magnitude of the estimated stator flux $|\psi_s|$ and a magnitude of a reference stator flux $|\omega_s|^*$) into a stator flux saturation controller output $s_\psi$. The torque comparator 205 transforms the torque error $e_T$ into a torque comparator output $c_T$. The reference torque $T_e^*$ and the reference stator flux $|\psi_s|^*$ correspond to desired values for the torque and the stator flux, respectively.

The saturation controllers 204 and 206 can generate normalized outputs for the torque saturation controller output $s_T$ and the stator flux saturation controller output $s_\psi$. For example, the saturation controllers 204 and 206 (shown in FIG. 2A) can generate outputs $s_T$ and $s_\psi$ using the following equation:

$$sat(x, B_w) = \begin{cases} 0.5 \times (\text{sgn}(x) + 1), & |x| \geq B_w \\ 0.5 \times \left(\frac{x}{B_w} + 1\right), & |x| < B_w \end{cases} \quad (8)$$

where x is an input (e.g., the stator flux error $e_\psi$ or the torque error $e_T$); $B_w$ is the upper boundary; sat(x, $B_w$) is an output (e.g., the torque saturation controller output $s_T$ or the stator flux saturation controller output $s_\psi$); and sgn(x) is the sign function.

Figure 2B:
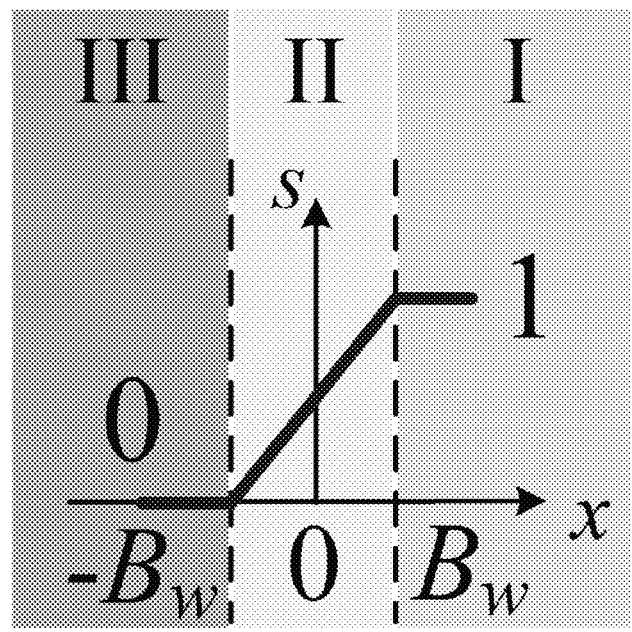
FIG. 2B is an example graph of an input and output of a saturation controller of the saturation controller-based DTC drive system of FIG. 2A.

Referring to FIG. 2B, the saturation controllers 204 and 206 can output a value corresponding to one of two discrete states or from a range of values between the two discrete states. In the normalized implementation as expressed in equation (8) and shown in FIG. 2B, the discrete states are 1 or 0. The discrete state of 1 can correspond to when the input x exceeds an upper boundary $B_w$, and the discrete state of 0 can correspond to when the input x is less than the lower boundary $-B_w$. The discrete state of 1 can be considered a high state that the saturation controller output sat(x, $B_w$) (hereby also referred to simply as the variable s) takes when the input x exceeds the upper boundary $B_w$. The discrete state of 0 can be considered a low state that the saturation controller output s takes when the input x falls below the lower boundary $-B_w$.

When the absolute value of the input x is below the boundary (or, when the input x is between the upper boundary and the lower boundary $-B_w$), the saturation controllers 204 and 206 transform the input x into the output s such that the output s takes a value in the range of [0, 1]. 0 and 1 therefore would correspond to the values for when the saturation controllers 204 and 206 are saturated.

In some examples, the range of [0, 1] is a continuous range of values that can be output by the saturation controllers 204, 206. The range of values can allow selection of the voltage vectors delivered to the inverter 214 to be more flexible so as to avoid overuse of nonzero vectors during a sampling period, which can lead to overshoot. In some examples, the value that the output s takes can be linearly proportional to the input x that the saturation controller 204 or 206 receives. The range of available values facilitates the pulse modulation for the inverter 214 and enables an adjustable duty ratio modulation within the desired limits.

The duty ratio modulator 209 implements the adjustable duty ratio modulation to generate the control signal 212 used to control the motor 202 in the switching cycle. The control signal 212 activates a specific combination of switches of the inverter 214 to place the inverter 214 in a specific inverter state for an activation time determined by the duty ratio modulator 209, as described herein. The inverter 214 thereby applies a voltage and current to the motor 202 based on the control signal 212.

In some implementations, the inputs of the switching table are the output $c_T$ of the torque hysteresis comparator 205 and the sector number determined by the position of the stator flux vector $\psi_s$. The determination of these two inputs will be described below.

The torque comparator 205 determines a value at the kth (current) step for the torque comparator output $c_T$ based on the following equation:

$$c_T[k] = \begin{cases} 1, & e_T[k] > B_{wh} \\ 0, & e_T[k] < -B_{wh} \\ c_T[k-1], & |e_T[k]| < B_{wh} \end{cases} \quad (9)$$

where $e_T$ is the torque error and $B_{wh}$ is the upper boundary of the torque comparator 205, which is substantially equal to or larger than the $B_w$ of the torque saturation controller. Equation (9) shows that the output of the torque hysteresis comparator 205 in the (k−1)th step ($c_T[k−1]$) will be maintained in the current step k if the input $e_T[k]$ is within $B_w$.

As described earlier, in a two-level, three-phase, voltage source inverter-fed drive system, a voltage vector can be selected from eight available voltage vectors and applied to, for example, a motor. Referring back to FIG. 1B, the inverter 214 (shown in FIG. 2A) can control the motor 202 using eight inverter voltage vectors $V_0$ through $V_7$. FIG. 1B shows a 2D spatial placement of the inverter voltage vectors $V_0$ through $V_7$ within an aft reference frame, which is a stationary reference frame generated using an aft transformation. The $\alpha\beta$ reference frame is divided into six equally-sized sectors. The vectors $V_0$ through $V_7$ define sectors 1 through 6 of the $\alpha\beta$ reference frame. Each active vector $V_1$ through $V_6$ bisects the sector having the same numerical label. In other words, the angle between one active vector (e.g., $V_1$) and the boundary of the sector containing the active vector (e.g., Sector 1) is 30 degrees. The estimator 210 determines the position of the estimated stator flux $\psi_s$ within the $\alpha\beta$ reference frame and selects one of the sectors 1 through 6 based on that position.

In some implementations, the switching table 208 differs from the switching table 108 in that the switching table 208 outputs a combination of multiple voltage vectors instead of a single voltage vector as implemented in the DTC system 100. The switching table 208 receives the sector number and the torque comparator output $c_T$ (generated by the torque comparator 205) and uses those inputs to select voltage vectors from among the inverter voltage vectors $V_0$ through $V_7$. An example of a switching table that outputs a combination of multiple voltage vectors for the saturation controller-based DTC system 200 is given in TABLE 2 below.

TABLE 2

Example of Switching Table 208 for the DTC System 200

| | Sector | | | | | |
|---|---|---|---|---|---|---|
| | 1 | 2 | 3 | 4 | 5 | 6 |
| $c_T = 1$ | $V_2$(110) | $V_3$(010) | $V_4$(011) | $V_5$(001) | $V_6$(101) | $V_1$(100) |
| | $V_3$(010) | $V_4$(011) | $V_5$(001) | $V_6$(101) | $V_1$(100) | $V_2$(110) |
| | $V_0$(000) | $V_0$(000) | $V_0$(000) | $V_0$(000) | $V_0$(000) | $V_0$(000) |

TABLE 2-continued

Example of Switching Table 208 for the DTC System 200

| | Sector | | | | | |
|---|---|---|---|---|---|---|
| | 1 | 2 | 3 | 4 | 5 | 6 |
| $c_T = 0$ | $V_6$(101) | $V_1$(100) | $V_2$(110) | $V_3$(010) | $V_4$(011) | $V_5$(001) |
| | $V_5$(001) | $V_6$(101) | $V_1$(100) | $V_2$(110) | $V_3$(010) | $V_4$(011) |
| | $V_0$(000) | $V_0$(000) | $V_0$(000) | $V_0$(000) | $V_0$(000) | $V_0$(000) |

TABLE 2 shows twelve table entries that can be selected based on the sector number and the torque hysteresis output $c_T$, in which each table entry includes three inverter voltage vectors. For example, when the stator flux linkage $\psi_s$ is positioned within sector 1, two potential sets of vectors can be selected, in which the first potential set includes vectors $V_2$, $V_3$, and $V_0$, the second potential set includes $V_6$, $V_5$, and $V_0$. Among these two sets of vectors, four inverter vectors $V_2$, $V_3$, $V_5$, $V_6$ are active vectors, and the inverter vector $V_0$ is a passive vector. The inverter voltage vectors $V_0$ and $V_7$ are zero vectors. Referring back to FIG. 1B, the four active inverter vectors $V_2$, $V_3$, $V_5$, $V_6$ that can be selected when the stator flux linkage $\psi_s$ is in sector 1 are shown. As described earlier, when the stator flux linkage $\psi_s$ falls in the sector 1, the application of the inverter vectors $V_0$, $V_2$, $V_3$, $V_5$, $V_6$, and $V_7$ can have the following effects (assuming that the rotor is rotating anti-clockwise):

- $V_2$(110) will increase both the torque $T_e$ and the stator flux amplitude $|\psi_s|$.
- $V_5$(001) will decrease both the torque $T_e$ and the stator flux amplitude $|\psi_s|$.
- $V_3$(010) will increase the torque $T_e$ and decrease the stator flux amplitude $|\psi_s|$.
- $V_6$(101) will decrease the torque $T_e$ and increase the stator flux amplitude $|\psi_s|$.
- Zero voltage vectors $V_0$(000) and $V_7$(111) will stop the stator flux linkage $\psi_s$ from moving, keep the stator flux amplitude $|\psi_s|$ constant, and decrease the electromagnetic torque $T_e$ (but not to the degree with which the torque $T_e$ will decrease with application of the active inverter vectors $V_5$(001) and $V_6$(101).

Although both the zero vectors $V_0$(000) and $V_7$(111) and the active vectors $V_5$(001) and $V_6$(101) can decrease the torque $T_e$, the rate at which the torque decreases is larger for the active vectors than for the zero vectors because the active voltage vectors $V_5$(001) and $V_6$(101) will make the stator flux vector $\psi_s$ rotate in the direction opposite to the rotating direction of the rotor flux vector $\psi_m$. The active voltage vectors $V_5$(001) and $V_6$(101) therefore can cause a more significant reduction of the torque and, thus, a larger torque ripple. The active vectors $V_5$(001) and $V_6$(101) can be used when a large torque decrease is needed. The passive vectors $V_0$(000) and $V_7$(111) can be applied when a smaller torque decrease is needed.

In the steady-state operation, the zero vectors can be used to decrease the torque to reduce torque ripples. If the rotor is rotating clockwise, the above-described effects will be opposite when applying the same voltage vector. A similar analysis applies to cases in which the stator flux linkage $\psi_s$ is positioned in another sector (e.g., one of sectors 2-6). Four active vectors and two passive vectors are available for each of the other sectors.

In the DTC system 200 of FIG. 2A, the switching table 208 is a two-level torque switching system. The example of the switching table 208 shown in TABLE 2 outputs three voltage vectors depending on the torque comparator output $c_T$ sent from the torque comparator 205. The three voltage vectors include two active voltage vectors and a passive voltage vector. As shown in TABLE 2, the top two voltage vectors of each entry are active voltage vectors, and bottom voltage vector of each entry is the passive voltage vector. When the stator flux linkage $\psi_s$ is positioned within sector 1, based on the analysis of the use of the active and passive voltage vectors described above, the following four scenarios describe qualitative rules for voltage vector selection in a switching cycle to minimize the torque error $e_T$ and the stator flux error $e_\psi$, while minimizing torque ripple:

Scenario (1): When $c_T[k]=1$ and $c_T[k-1]=0$, the torque tracking error $e_T[k]>B_w$, meaning that the torque needs to be increased significantly. The active voltage vectors $V_2(110)$ and $V_3(010)$ can increase the torque relatively faster and therefore can be applied to decrease the tracking error. The durations of these two vectors in one switching cycle are assigned according to the output $s_\psi$ of the stator flux saturation controller 206 to obtain a smooth and circular stator flux trajectory. The zero vector $V_0(000)$ can be selected by the switching table 208 but need not necessarily be used by the duty ratio modulator 209.

Scenario (2): When $c_T[k]=c_T[k-1]=1$, either $e_T[k]>B_w$ or $|e_T[k]|<B_w$. If $e_T[1]>B_w$ then the voltage vector assignment in scenario (1) is implemented. If $|e_T[k]|<B_w$, the PMSM drive system is operating in a quasi-steady state and the torque $T_e$ can be adjusted slightly to keep the torque error $e_T$ within the boundaries $B_w$. In this case, the active vectors $V_2(110)$ and $V_3(010)$ can be applied for part of the entire switching cycle to keep the torque $T_e$ increasing. The zero vector $V_0(000)$ can be used for a certain portion of the switching cycle to reduce the torque $T_e$ and reduce the torque ripple. One or both of the active vectors $V_2(001)$ and $V_3(101)$ can be applied for a portion of the switching cycle.

Scenario (3): When $c_T[k]=0$ and $c_T[k-1]=1$, the torque tracking error $e_T[k]<-B_w$, meaning that the torque needs to be decreased significantly. The active voltage vectors $V_5(001)$ and $V_6(101)$ can decrease the torque relatively faster and therefore can be applied to decrease the tracking error. The durations of these two vectors in one switching cycle can be assigned according to the output $s_\psi$ of the stator flux saturation controller 206 to obtain a smooth and circular trajectory for the stator flux. The zero vector $V_0(000)$ can be selected but not used.

Scenario (4): When $c_T[k]=c_T[k-1]=0$, either $e_T[k]<-B_w$ or $|e_T[k]|<B_w$. If $e_T[k]<-B_w$, then the voltage vector assignment in scenario (3) is implemented. If $|e_R[k]|<B_w$, similar to scenario 2, the PMSM drive system is operating in a quasi-steady state. The torque $T_e$ only needs to be adjusted slightly to keep the torque error $e_T$ within the boundaries. In this case, the active vectors $V_5(001)$ and $V_6(101)$ are not applied for the whole switching cycle. Rather, the zero vector $V_0(000)$ is used for a certain portion of the switching cycle to reduce the torque ripple. One or both of the active vectors $V_5(001)$ and $V_6(101)$ can be applied for a portion of the switching cycle. Scenarios (3) and (4) are usually seen in the regenerative braking mode of the PMSM.

Although both of the passive vectors $V_0$ and $V_7$ could be applied to decrease the torque, only the vector $V_0$ is available for each table entry in the example of the switching table 208 shown in TABLE 2. In some implementations, as described herein, $V_7$ is the available passive vector, or a combination of both of $V_0$ and $V_7$ is available. Using $V_0(000)$ only, as described with respect to TABLE 2, or $V_7(111)$ only can simplify the modulation algorithm and reduce the switching times of the inverter switches.

Figure 2C:
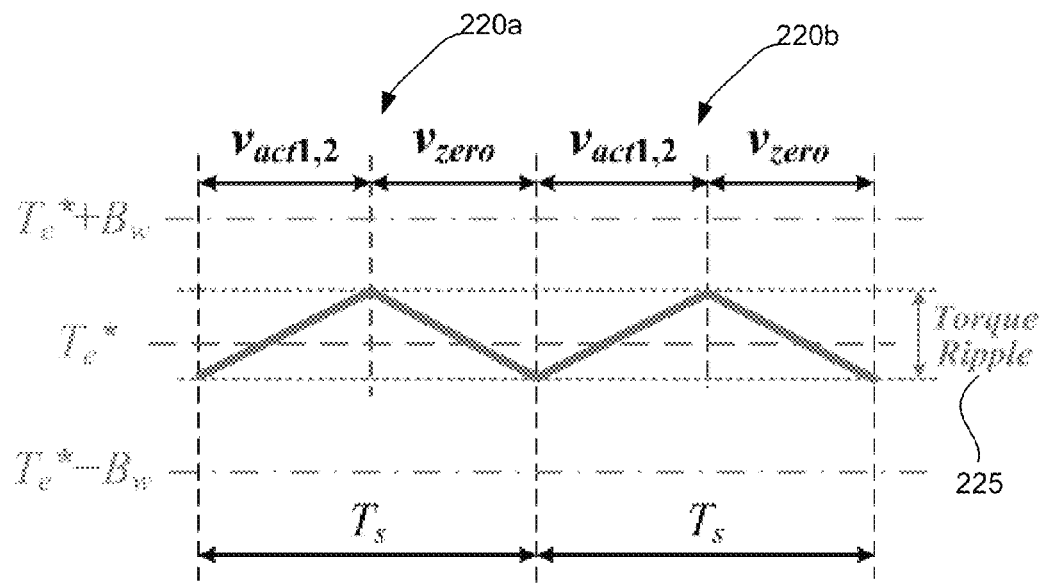
FIG. 2C is an example graph of torque ripple.

FIG. 2C depicts example switching cycles 220a and 220b that include a torque ripple 225 that may occur during implementation of the DTC control systems described herein. In particular, the torque ripple 225 may occur as part of the responses of the motor controller 215 described in the above described scenarios (1) through (4).

The torque ripple 225 is shown to be contained within an interval smaller than the interval defined by the upper boundary $T_e^* + B_w$ and the lower boundary $T_e^* - B_w$. The larger interval defined by the upper boundary $T_e^* + B_w$ and the lower boundary $T_e^* - B_w$ represents the extent of the torque ripple that may be found in the DTC system 100, which simply uses hysteresis controllers 104 and 106. The torque ripple 225 corresponds to the torque ripple that may be found in the DTC system 200, which uses the saturation controllers 204 and 206.

The torque hysteresis comparator 205 provides a supplementary signal (i.e., $c_T$) to determine when to enable a sharp torque decrease to promote the fast dynamic response of the DTC system 200. The activation time for $V_0(000)$ during a switching cycle is determined by the output $s_T$ of the torque saturation controller 204. The activation times of the active and passive vectors for the same switching cycle can be determined using methods as described in detail herein.

As shown in FIG. 2C, each switching cycle 220a, 220b includes a portion of time in which an active vector $v_{act1,2}$ is activated and a portion of time in which a zero vector $v_{zero}$ is activated. Referring to FIG. 2A, in a switching cycle, the duty ratio modulator 209 selects a linear combination of the selected passive and active voltage vectors and delivers the control signal 212 to control the inverter 214 to minimize the torque error $e_T$ and flux error $e_\psi$. The duty ratio modulator 209 quantitatively implements the voltage vector assignments in scenarios (1) through (4) as described above based on the outputs of the saturation controllers 204, 206. As described above, the saturation controllers 204 and 206 can output not only the discrete state 0 or 1 but also values between 0 and 1. The duty ratio modulator 209 can use the normalized outputs $s_T$ and $s_\psi$ of the saturation controllers 204 and 206 to compute coefficients for the linear combination of the selected voltage vectors that will minimize the torque error $e_T$ and flux error $e_\psi$. The coefficients correspond to activation times for each of the vectors. The duty ratio modulator 209 determines the duty ratio vector d based on the following equation:

$$d = s_T(s_\psi \cdot v_{act1} + (1-s_\psi) \cdot v_{act2}) + (1-s_T) \cdot v_{zero}, \text{ when}(c_T=1) \quad (10)$$

$$d = (1-s_T)(s_\psi \cdot v_{act1} + (1-s_\psi) \cdot v_{act2}) + s_T v_{zero}, \text{ when } (c_T=0) \quad (11)$$

where $v_{act1}$, $v_{act2}$ and $v_{zero}$ are the selected three voltage vectors shown in the same order in TABLE 2.

The switching table 208 selects two active vectors $v_{act1}$ and $v_{act2}$ and a zero vector $v_{zero}$ at one time based on the position of the stator flux $\psi_s$ within one of the six sectors and the torque comparator output $c_T$. The three elements in the desired duty ratio vector d can correspond to the activation times of each of the three selected inverter voltage vectors. For example, a duty ratio vector d of (0.2, 0.4, 0.4) can correspond to activation times of 20%, 40%, and 40% of the switching period for the active vector $v_{act1}$, the active vector $v_{act2}$, and the zero vector $v_{zero}$. In each switching cycle, equation (10) or (11) can be used to determine the duty ratio vector d when $c_T$ equals to 1 or 0, respectively.

While the switching table depicted in TABLE 2 is shown to include table entries having three distinct vectors, in some implementations, the switching table 208 for the saturation controller-based DTC system 200 can be modified so that each table entry includes additional or fewer voltage vectors. For instance, the example of the switching table 208 in TABLE 3 differs from the example of the switching table 208 in TABLE 2 in that a combination of both of the passive vectors $V_0(000)$ and $V_7(111)$ can be applied during a switching cycle.

TABLE 3

Example of Switching Table 208 for the DTC System 200

| | Sector | | | | | |
|---|---|---|---|---|---|---|
| | 1 | 2 | 3 | 4 | 5 | 6 |
| $c_T = 1$ | $V_2(110)$ | $V_3(010)$ | $V_4(011)$ | $V_5(001)$ | $V_6(101)$ | $V_1(100)$ |
| | $V_3(010)$ | $V_4(011)$ | $V_5(001)$ | $V_6(101)$ | $V_1(100)$ | $V_2(110)$ |
| | $V_0(000)$ | $V_0(000)$ | $V_0(000)$ | $V_0(000)$ | $V_0(000)$ | $V_0(000)$ |
| | $V_7(111)$ | $V_7(111)$ | $V_7(111)$ | $V_7(111)$ | $V_7(111)$ | $V_7(111)$ |
| $c_T = 0$ | $V_6(101)$ | $V_1(100)$ | $V_2(110)$ | $V_3(010)$ | $V_4(011)$ | $V_5(001)$ |
| | $V_5(001)$ | $V_6(101)$ | $V_1(100)$ | $V_2(110)$ | $V_3(010)$ | $V_4(011)$ |
| | $V_0(000)$ | $V_0(000)$ | $V_0(000)$ | $V_0(000)$ | $V_0(000)$ | $V_0(000)$ |
| | $V_7(111)$ | $V_7(111)$ | $V_7(111)$ | $V_7(111)$ | $V_7(111)$ | $V_7(111)$ |

TABLE 3, similar to TABLE 2, shows twelve table entries that can be selected based on the sector number and the torque hysteresis output $c_T$. In contrast to the three available vectors in each table entry of TABLE 2, each table entry in TABLE 3 includes four vectors. Thus, in the example of the switching table 208 shown in TABLE 3, the switching table 208 outputs four voltage vectors depending on the torque comparator output $c_T$ sent from the torque comparator 205. The four vectors include the two passive vectors $V_0$ and $V_7$ and two active vectors selected from the six active vectors $V_1$ to $V_6$. As shown in TABLE 3, the top two voltage vectors of each entry are active voltage vectors, and bottom two voltage vectors of each entry are the passive voltage vectors.

When the stator flux linkage $\psi_s$ is positioned within sector 1, the following four scenarios describe qualitative rules for voltage vector selection to minimize the torque error $e_T$ and the stator flux error $e_\psi$ while minimizing torque ripple using TABLE 3 for the switching table 208:

Scenario (1): When $c_T[k]=1$ and $c_T[k-1]=0$, the torque tracking error $e_T[k]>B_w$, meaning that the torque needs to be increased significantly. The active voltage vectors $V_2(110)$ and $V_3(010)$ can increase the torque relatively faster and therefore are applied to reduce the tracking error. The durations of these two vectors in one switching cycle are assigned according to the output $s_\psi$ of the stator flux saturation controller 206 to obtain a smooth and circular stator flux trajectory. The zero vectors $V_0(000)$ and/or $V_7(111)$ can be selected by the switching table 208 but need not necessarily be used by the duty ratio modulator 209.

Scenario (2): When $c_T[k]=c_T[k-1]=1$, either $e_T[k]>B_w$ or $|e_T[k]|<B_w$. If $e_T[k]>B_w$, then the voltage vector assignment in scenario (1) is implemented. If $|e_T[k]|<B_w$ the PMSM drive system is operating in a quasi-steady state and the torque $T_e$ can be adjusted slightly to keep the torque error $e_T$ within the boundaries $B_w$. In this case, the active vectors $V_2(110)$ and $V_3(010)$ can be applied for part of the entire switching cycle to keep the torque $T_e$ increasing. One or both of the active vectors $V_2(001)$ and $V_3(101)$ can be applied for a portion of the switching cycle. The zero vectors $V_0(000)$ and/or $V_7(111)$ can be used for a certain portion of the switching cycle to reduce the torque $T_e$ and reduce the torque ripple.

Scenario (3): When $c_T[k]=0$ and $c_T[k-1]=1$, the torque tracking error $e_T[k]<-B_w$, meaning that the torque needs to be decreased significantly. The active voltage vectors $V_5(001)$ and $V_6(101)$ can decrease the torque and therefore can be applied to reduce the tracking error. The durations of these two vectors in one switching cycle can be assigned according to the output $s_\psi$ of the stator flux saturation controller 206 in order to obtain a smooth and circular trajectory for the stator flux. The zero vectors $V_0(000)$ and/or $V_7(111)$ will be selected but not used.

Scenario (4): When $c_T[k]=c_T[k-1]=0$, either $e_T[k]<-B_x$, or $|e_T[k]|<B_w$. If $e_T[k]<-B_w$, then the voltage vector assignment in scenario (3) is implemented. If $|e_R|[1]<B_w$, similar to scenario 2, the PMSM drive system is operating in a quasi-steady state and the torque $T_e$ only needs to be adjusted slightly to keep the torque error $e_T$ within the boundaries $B_w$. In this case, the active vectors $V_5(001)$ and $V_6(101)$ are not applied for the whole switching cycle. The zero vectors $V_0(000)$ and/or $V_7(111)$ will be used for a certain period of the switching cycle to reduce the torque ripple. One or both of the active vectors $V_5(001)$ and $V_6(101)$ can be applied for a portion of the switching cycle. Scenarios (3) and (4) are usually seen in the regenerative braking mode of the PMSM.

Using a combination of $V_0(000)$ and $V_7(111)$, as described above with respect to TABLE 3, may reduce the harmonics of output voltages or currents. The activation times for zero vectors in a switching cycle are determined by the output $s_T$ of the torque saturation controller 204. The activation times of the active and passive vectors for the same switching cycle can be determined using methods as described in detail herein.

In this example of the switching table 208 in which a combination of $V_0(000)$ and $V_7(111)$ is used, the duty ratio modulator 209 determines the duty ratio vector d based on the following equation:

$$d=s_T(s_\psi v_{act1}+(1-s_\psi)\cdot v_{act2})++(1-s_T)\cdot(\mu\cdot V_0+(1-\mu)\cdot V_7),$$
when $(c_T=1)$ \hfill (12)

$$d=(1-s_T)(s_\psi v_{act1}+(1-s_\psi)\cdot v_{act2})+s_T(\mu\cdot V_0+(1-\mu)\cdot V_7),$$
when $(c_T=0)$ \hfill (13)

where $v_{act1}$, $v_{act2}$, $V_0$ and $V_7$ are the selected four voltage vectors. The vectors $v_{act1}$, $v_{act2}$ are selected from the active vectors. $\mu$ is a weighting factor determining the weights of two zero vectors. $\mu$ can be a constant or a variable. Equations (12) and (13) differ from equations (10) and (11) in that equations (12) and (13) include the weighting factor $\mu$ that determines the activation times for the zero vectors $V_0$ and $V_7$ relative to one another.

When the DTC system 200 implements the duty ratio modulation scheme shown in equations (12) and (13), the value for the weighting factor $\mu$ can determine specific pulse width modulation (PWM) techniques facilitated by the switching table 208 and the duty ratio modulator 209. These techniques include, for example, continuous PWM (CPWM) implemented in the DTC system 200 when the weighting factor $\mu=0.5$, discontinuous PWM minimum (DPWMMIN) implemented in the DTC system 200 when the weighting factor $\mu=1$, discontinuous PWM maximum (DPWMMAX) implemented in the DTC system 200 when the weighting factor $\mu=0$, discontinuous PWM (DPWM) implemented in the DTC system 200 when the value for the weighting factor $\mu$ varies when the stator flux linkage $\psi_s$ is positioned in different sector numbers. While the values for the weighting factor $\mu$ are described to be 0, 0.5, or 1, the weighting factor $\mu$ can be set to other values to achieve optimal performance under different operating conditions or applications of the DTC system 200.

In a DPWMMAX scheme, when the weighting factor $\mu=0$, the zero vector $V_7$ is weighted such that the zero vector $V_7$ is applied while the zero vector $V_0$ is not applied. TABLE 4 below represents an example of the switching table equivalent to when the weighting factor $\mu=0$. TABLE 4 is similar to the example of the switching table 208 represented in TABLE 2 except that the passive vector in each table entry of TABLE 4 is the zero vector $V_7(111)$.

TABLE 4

Example of Switching Table 208 for the DTC System 200 when $\mu = 0$

| | Sector | | | | | |
|---|---|---|---|---|---|---|
| | 1 | 2 | 3 | 4 | 5 | 6 |
| $c_T = 1$ | $V_2(110)$ | $V_3(010)$ | $V_4(011)$ | $V_5(001)$ | $V_6(101)$ | $V_1(100)$ |
| | $V_3(010)$ | $V_4(011)$ | $V_5(001)$ | $V_6(101)$ | $V_1(100)$ | $V_2(110)$ |
| | $V_7(111)$ | $V_7(111)$ | $V_7(111)$ | $V_7(111)$ | $V_7(111)$ | $V_7(111)$ |
| $c_T = 0$ | $V_6(101)$ | $V_1(100)$ | $V_2(110)$ | $V_3(010)$ | $V_4(011)$ | $V_5(001)$ |
| | $V_5(001)$ | $V_6(101)$ | $V_1(100)$ | $V_2(110)$ | $V_3(010)$ | $V_4(011)$ |
| | $V_7(111)$ | $V_7(111)$ | $V_7(111)$ | $V_7(111)$ | $V_7(111)$ | $V_7(111)$ |

In a DPWMMIN scheme, when the weighting factor $\mu=1$, the zero vector $V_0$ is weighted such that the zero vector $V_0$ is applied while the zero vector $V_7$ is not applied. The switching table shown in TABLE 2 would correspond to the equivalent switching table when the value of $\mu$ is set to 1.

In a CPWM scheme, when the weighting factor $\mu=0.5$, the zero vector $V_0$ and the zero vector $V_7$ are equally weighted such that they have substantially equal activation times. The switching table 208 selects two active vectors $v_{act1}$ and $v_{act2}$ and two zero vectors $V_0$ and $V_7$ at one time based on the position of the stator flux $\psi_s$ within one of the six sectors and the torque comparator output $c_T$. The switching table 208 for the CPWM scheme can correspond to the example of the switching table represented in TABLE 3. The activation times of each of the four selected inverter voltage vectors can be calculated by equation (12) or (13). In each switching cycle, equation (12) and (13) can be used to determine the duty ratio vector d when $c_T$ equals to 1 and 0, respectively.

In a DPWM scheme, the weighting factor $\mu$ can vary depending on the sector number determined based on the position of the stator flux vs. In some examples, in a DPWM scheme, $\mu=1$ for sectors 1, 3 and 5 and $\mu=0$ for sectors 2, 4 and 6. The switching table for these values of $\mu$ corresponds to the equivalent switching table shown in TABLE 5 below.

TABLE 5

Example of Switching Table 208 for the DTC System 200 when $\mu = 0$ for Sectors 2, 4, and 6 and $\mu = 1$ for Sectors 1, 3 and 5

| | Sector | | | | | |
|---|---|---|---|---|---|---|
| | 1 | 2 | 3 | 4 | 5 | 6 |
| $c_T = 1$ | $V_2(110)$ | $V_3(010)$ | $V_4(011)$ | $V_5(001)$ | $V_6(101)$ | $V_1(100)$ |
| | $V_3(010)$ | $V_4(011)$ | $V_5(001)$ | $V_6(101)$ | $V_1(100)$ | $V_2(110)$ |
| | $V_0(000)$ | $V_7(111)$ | $V_0(000)$ | $V_7(111)$ | $V_0(000)$ | $V_7(111)$ |

TABLE 5-continued

Example of Switching Table 208 for the DTC System 200 when $\mu = 0$ for Sectors 2, 4, and 6 and $\mu = 1$ for Sectors 1, 3 and 5

| | Sector | | | | | |
|---|---|---|---|---|---|---|
| | 1 | 2 | 3 | 4 | 5 | 6 |
| $c_T = 0$ | $V_6(101)$ | $V_1(100)$ | $V_2(110)$ | $V_3(010)$ | $V_4(011)$ | $V_5(001)$ |
| | $V_5(001)$ | $V_6(101)$ | $V_1(100)$ | $V_2(110)$ | $V_3(010)$ | $V_4(011)$ |
| | $V_0(000)$ | $V_7(111)$ | $V_0(000)$ | $V_7(111)$ | $V_0(000)$ | $V_7(111)$ |

The weighting factor $\mu$ can be preprogrammed into the motor controller 215 such that the switching table 208 can operate using one of the PWM control schemes described herein. In some implementations, the preprogrammed weighting factor $\mu$ is a default value, and the motor controller 215 may include a user interface that the user can use to control the value for the weighting factor $\mu$. The motor controller 215 can include, for example, a touchscreen display, a keyboard, a switch, a dial, a keypad, or other device that enables a user of the motor controller 215 to easily select the value for the weighting factor $\mu$.

Additional Implementations of DTC

The DTC system 200 includes a torque control loop that mitigates the torque error $e_T$ and a stator flux control loop that mitigates the flux error $e_\psi$. In some implementations of the DTC system 200, the saturation controllers 204 and 206 may provide the following attributes for the control loops:

In the torque control loop, a 50% to 50% distribution between the active vectors and the zero vector in one switching cycle may maintain the torque tracking error $e_T$ to be zero;

In the stator flux control loop, a 50% to 50% distribution between the selected two active vectors may maintain the stator flux magnitude error $e_\psi$ to be zero.

In some implementations, the DTC system 200 can implement the saturation controllers 204 and 206 as adaptive saturation controllers that can reduce the error associated with non-ideal performance of the control loops. The saturation controllers 204 and 206, when implemented as adaptive saturation controllers, can generate outputs $s_T$ and $s_\psi$ using the following equation:

$$sat(x, B_w) = \begin{cases} 0.5 \times (sgn(x) + 1), & |x| \geq B_w \\ 0.5 \times \dfrac{x}{B_w} + d^*, & |x| < B_w \end{cases} \quad (12)$$

where x is an input (e.g., the stator flux error $e_\psi$ or the torque error $e_T$); is the upper boundary; sat(x, $B_w$) is an output (e.g., the torque saturation controller output $s_T$ or the stator flux saturation controller output $s_\psi$); sgn(x) is the sign function; and d* is an equilibrium duty ratio. The equilibrium duty ratio d* is the output of the saturation controller when the input x of the saturation controller is zero. Each of the saturation controllers 204 and 206 can have an equilibrium duty ratio d*, which reduces steady state error associated with, for example, stator flux and torque ripple.

Torque Control Loop

In some implementations, the torque control loop can account for variations in back electromotive force (EMF) variations of the motor 202 using the equilibrium duty ratio d*. The back EMF is directly proportional to the rotor speed of the motor 202. The output voltage $u_{abc}$ of the inverter 214 can be adjusted with speed variations of the motor 202 to generate the desired torque.

Figure 2D:
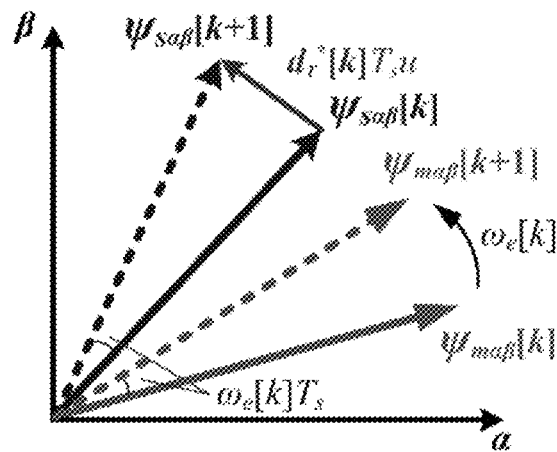
FIGS. 2D-2E are diagrams of discretized stator flux vectors in a stationary reference frame as estimated by the saturation controller-based DTC drive system of FIG. 2A.
Figure 2E:
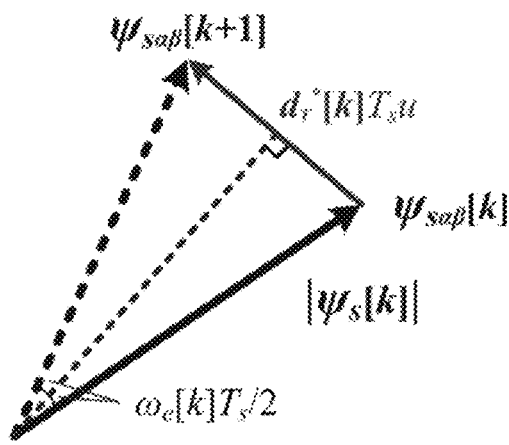

FIGS. 2D-E show discretized stator flux vectors $\psi_s$ and rotor flux vectors $\psi_m$. For example, $\psi_{s\alpha\beta}[k+1]$ and $\psi_{s\alpha\beta}[k]$ are the stator flux vectors in the $\alpha\beta$ stationary reference frame in the (k+1)th and kth time steps, respectively; $\psi_{m\alpha\beta}[k+1]$ and $\psi_{m\alpha\beta}[k]$ are the rotor flux vectors in the $\alpha\beta$ stationary reference frame in the (k+1)th and kth steps, respectively; $\omega_e[k]$ is the electrical rotor speed in the kth step; $d_T^*[k]$ is the equilibrium duty ratio of the torque-loop saturation controller 204 in the kth step; $T_s$ is the sampling period; and u is the magnitude of the stator voltage vector that can be produced by the DC voltage.

When the motor 202 is operating in a steady state, a constant torque reference $T_e^*$ and constant stator flux reference $|\psi_s|^*$ are applied. As a result, the torque error $e_T$ and stator flux error $e_\psi$ in the kth step are both zero. In order to output the desired electromagnetic torque $T_e$ in the next step, the torque angle is constant. Thus, the angle swept by the stator flux vectors $\psi_{s\alpha\beta}[k+1]$ and $\psi_{s\alpha\beta}[k]$ and the angle swept by the rotor flux vectors $\psi_{m\alpha\beta}[k+1]$ and $\psi_{m\alpha\beta}[k]$ within one sampling period are identical. The change of the stator flux magnitude within one sampling period can be neglected. Therefore, the mathematical relation in the stator flux triangle shown in FIG. 2D can be expressed as $$\sin\left(\omega_e[k]\frac{T_s}{2}\right) = \frac{\left(d_T^*[k]T_s\frac{u}{2}\right)}{\|\psi_s[k]\|} \quad (13)$$

Since the angle increment $$\omega_e[k]\frac{T_s}{2}$$

between two time steps is small, equation (13) can be simplified. As shown in FIG. 2E, using a small angle approximation, equation (13) can be simplified to $$\sin\left(\omega_e[k]\frac{T_s}{2}\right) \approx \omega_e[k]\frac{T_s}{2} = \frac{\left(d_T^*[k]T_s\frac{u}{2}\right)}{\|\psi_s[k]\|} \quad (14)$$

The equivalent duty ratio for the torque-loop saturation controller can thus be derived as $$d_T^*[k] = \frac{\sqrt{3}\,\omega_e[k]\|\psi_s[k]\|}{V_{DC}[k]} \quad (15)$$

where $u=V_{DC}[k]/\sqrt{3}$ in the linear modulation region for a three-phase two-level inverter. The duty ratio expressed in equation (15) can be implemented into the torque control loop in order to reduce torque ripple associated with variations in the motor speed or causes of steady state error.

Stator Flux Control Loop

In some implementations, the stator flux control loop can account for variations in the stator flux waveform using the equilibrium duty ratio d*. For example, the stator flux control loop can improve the fidelity of the stator flux waveform as the stator flux vector $\psi_s$ moves from one sector to another sector in the $\alpha\beta$ reference frame. In some instances, saturation controllers can lead to six-pulse periodic oscillations of the stator flux waveform because the increment and the decrement of the magnitude of the stator flux vector caused by the two selected active voltage vectors are unequal.

Figure 2F:
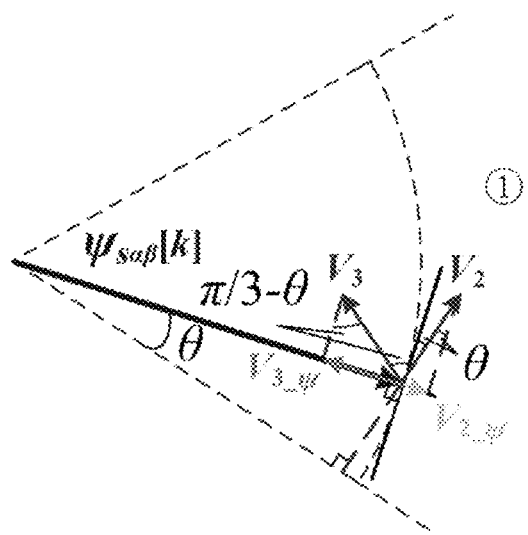
FIG. 2F is an example diagram of active voltage vectors applied to a stator flux vector in a stationary reference frame, where the active voltage vectors are inverter voltage vectors of an inverter of the saturation controller-based DTC system of FIG. 2A.

In one example illustrated in FIG. 2F, the stator flux vector $\psi_{s\alpha\beta}$ lies in sector 1. The switching table selects $V_2(110)$ and $V_3(010)$ as the active voltage vectors. The projections of the two active voltage vectors on the stator flux vector, $V_2$ and $V_3$ are different except for $\theta=\pi/6$. $V_{2\_\psi}$ and $V_{3\_\psi}$ are expressed as $$V_{2\_\psi} = |V_2|\sin\theta \quad (16)$$

$$V_{3\_\psi} = |V_3|\sin\left(\frac{\pi}{3}-\theta\right) \quad (17)$$

$V_{2\_\psi}$ can be set to equal $V_{3\_\psi}$ so that the magnitude of stator flux vector $\psi_s$ remains substantially the same with application of the active voltage vectors. The on-time ratio between $V_{2\_\psi}$ and $V_{3\_\psi}$ can be then expressed as $$\frac{t_{on\_V_2}}{t_{on\_V_3}} = \frac{\sin\left(\frac{\pi}{3}-\theta\right)}{\sin\theta}, \theta \in \left[0, \frac{\pi}{3}\right] \quad (18)$$

by applying $|V_2|=|V_3|$. According to equations (10) and (11), the total on-time of the two active vectors satisfies the equation $t_{on\_V_2}+t_{on\_V_3}=s_T T_s$. Therefore, the ratio of $t_{on\_V_2}$ to $s_T T_s$ can be expressed as $$\frac{t_{on\_V_2}}{s_T T_s} = \frac{\sin\left(\frac{\pi}{3}-\theta\right)}{\sin\left(\frac{\pi}{3}+\theta\right)}, \theta \in \left[0, \frac{\pi}{3}\right] \quad (19)$$

The right-hand-side term of equation (19) can be approximated by a linear function $$f(\theta) = 1 - \frac{3\theta}{\pi},$$

The equilibrium duty ratio $d_\psi^*[k]$ of the flux-loop saturation controller 206 expressed by equation (11) can be approximated by $$d_T^*[k] = 1 - \frac{3\theta}{\pi}, \theta \in \left[0, \frac{\pi}{3}\right] \quad (20)$$

With this modification, the DTC system can account for variations in the magnitude of the active voltage vectors which can shift the magnitude of the stator flux vector vs. The modification can further reduce the stator flux ripples, allow the trajectory of the stator flux to become smoother and more circular, and reduce the six-pulse periodic oscillations in the stator flux.

Examples Comparing DTC Systems

The following sections describe simulations and experiments that measure the performance of the hysteresis controller-based and saturation controller-based DTC schemes. The implemented hysteresis controller-based scheme corresponds to the DTC system 100 described with respect to FIG. 1A, and the implemented saturation controller-based scheme corresponds to the DTC system 200 described with respect to FIG. 2A. The saturation controller-based DTC scheme includes the additional torque and stator flux control loop modifications related to the equilibrium duty ratio as described above. The effectiveness of the example DTC schemes is verified by simulation and experimental results on a 200-W PMSM drive system.

Computational Simulations

Simulation studies were carried out in MATLAB®/Simulink® to validate the proposed DTC scheme for a 200 W PMSM drive system. The parameters of the PMSM were as follows:

rated power=200 W;
maximum speed=3000 RPM;
R=0.235Ω;
$L_d$=0.275 mH;
$L_q$=0.364 mH;
voltage constant $K_e$=9.7 V/kRPM;
number of pole pairs p=4;
momentum of inertia J=0.000007 kg·m²;
DC bus voltage of the inverter=41.75 V; and
sampling frequency is 10 kHz.

The boundaries of the torque and stator flux saturation functions and hysteresis comparators were 0.3 N·m and 0.003 V·s, respectively. The dead-time effect and voltage drop of the power electronics devices were not considered in the simulation model.

The steady-state performances of the saturation controller-based DTC and the hysteresis controller-based DTC were compared under various operating conditions. Firstly, the PMSM was operated at 1500 RPM and the commands of the torque and the stator flux linkage were 0.75 N·m and 0.0135 V·s, respectively.

Figure 3A:
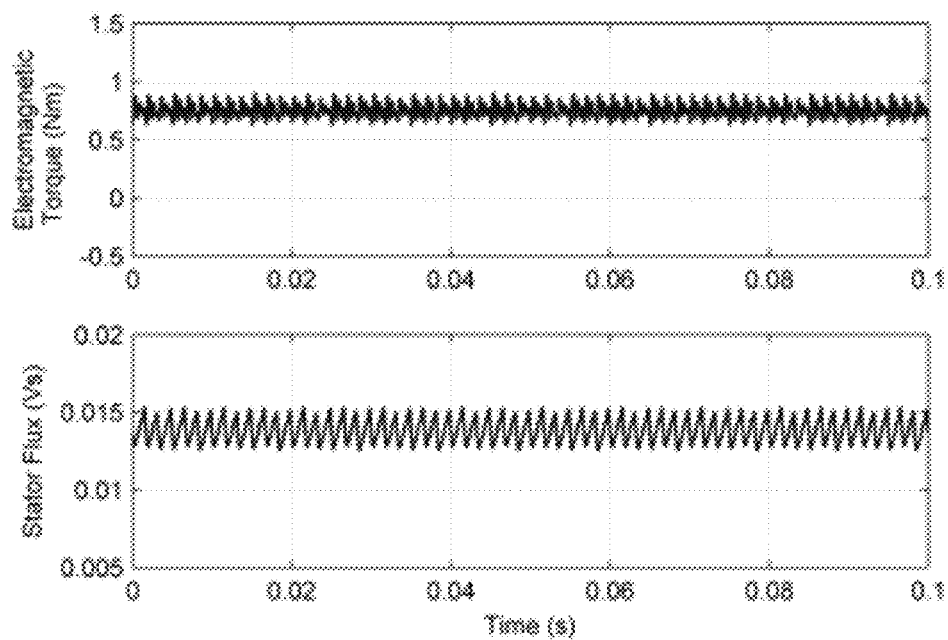
FIGS. 3A-3D are graphs generated from simulations of a hysteresis-controller based DTC system and a saturation-controller-based DTC system.
Figure 3B:
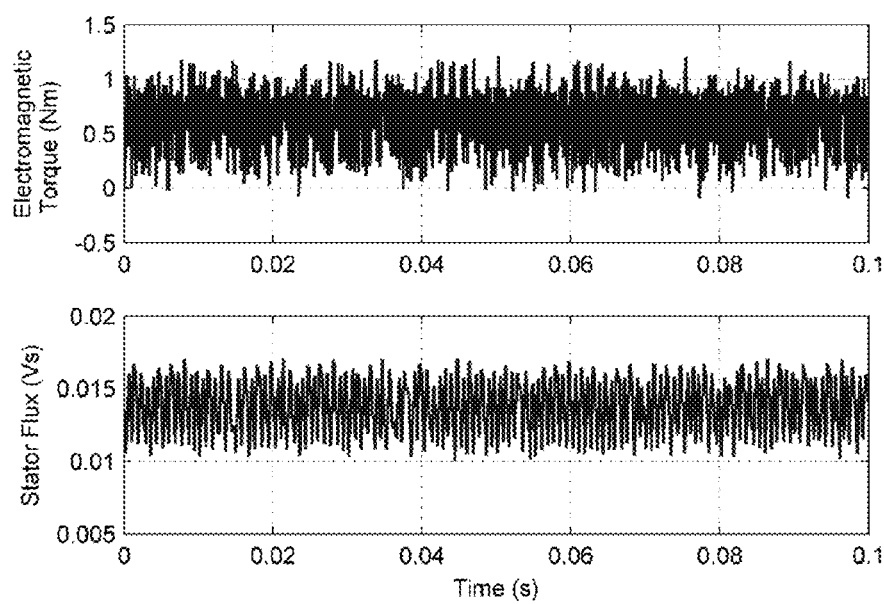

The torque and stator flux waveforms of the saturation controller-based DTC system are shown in FIG. 3A. The torque and stator flux waveforms of the hysteresis controller-based DTC system are shown in FIG. 3B. As shown in FIG. 3A, in the simulation of the saturation controller-based DTC, the peak-to-peak torque ripples were less than 0.26 N·m; the stator flux ripples were less than 0.0026 V·s; and the average torque was 0.75 N·m. As shown in FIG. 3B, when the hysteresis controller-based DTC was simulated, the peak-to-peak torque ripples were frequently larger than 1 N·m; peak-to-peak stator flux ripples went up to 0.006 V·s; and the estimated average torque was 0.63 N·m. Compared to the hysteresis controller-based DTC, the saturation controller-based DTC had torque and flux ripples that were 74% and 57% lower, respectively. The saturation controller-based DTC outputted a larger mean torque at the same operating condition.

Figure 3C:
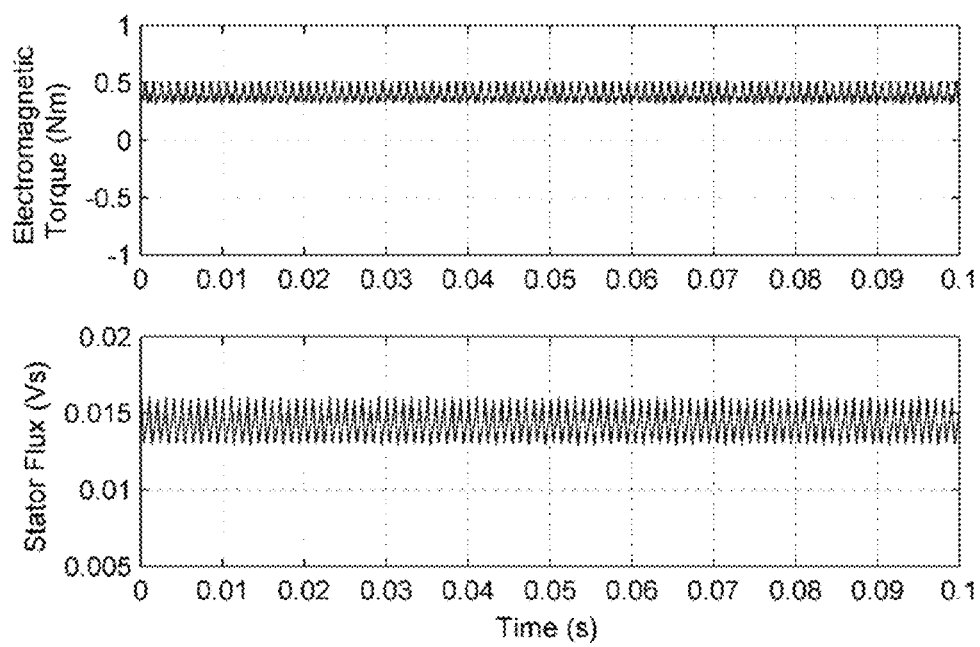
Figure 3D:
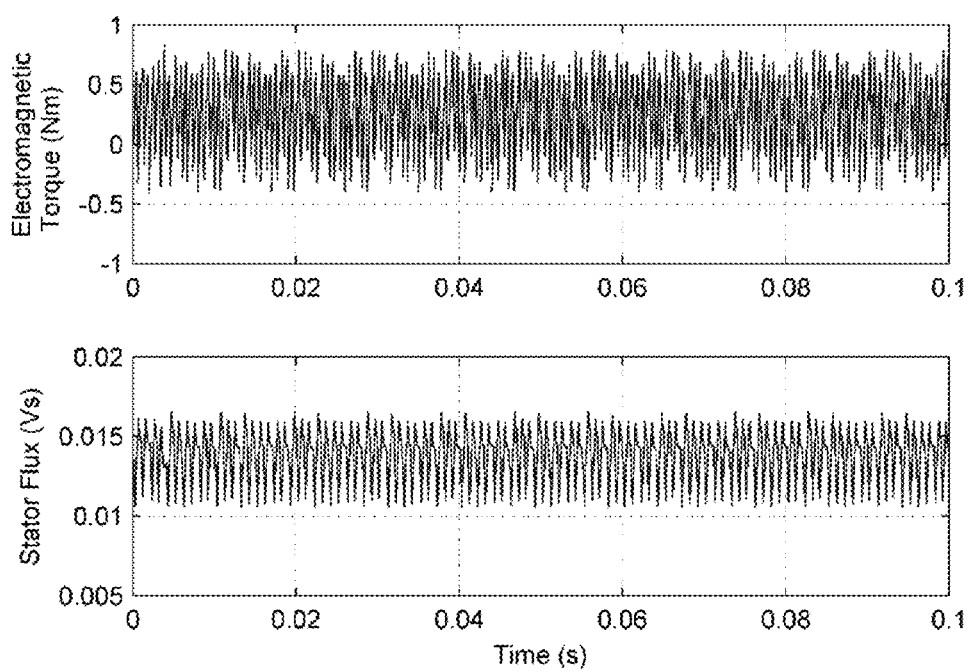

FIGS. 3C and 3D respectively show the performance of the saturation controller-based DTC scheme and the hysteresis controller-based DTC scheme at a higher rotor speed of 2500 RPM. The commands of the torque and the stator flux linkage were 0.5 N·m and 0.0135 V·s, respectively. As shown in FIG. 3C, the peak-to-peak torque and stator flux ripples for the saturation controller-based DTC system were less than 0.19 N·m and 0.003 V·s, respectively. As shown in FIG. 3D, when the hysteresis controller-based DTC was simulated, the peak-to-peak torque and stator flux ripples became larger than 1 N·m and 0.006 V·s, respectively. In this case, the saturation controller-based DTC was able to reduce the torque and flux ripples by more than 80% and 55%, respectively, compared with the hysteresis controller-based DTC.

Steady-State Experimental Study

Figure 4A:
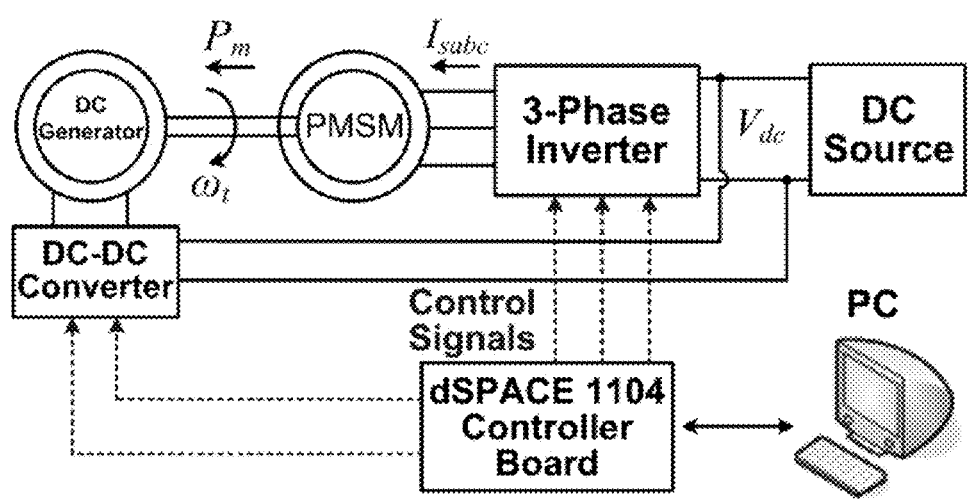
FIG. 4A is a diagram of an experimental setup for a hysteresis-controller based DTC system and a saturation-controller-based DTC system.

Experimental studies were carried out on the 200 W PMSM drive system used in simulation studies. Referring to FIG. 4A, the control algorithms were implemented in a dSPACE 1104 real-time control system with a sampling period of 100 μs. The dead-time was set as 1 μs. A three-phase inverter was used to drive the PMSM. A DC generator was connected to a full bridge DC-DC converter, which operated as a load. The PMSM and the DC generator were connected via a mechanical coupling. The experimental results were recorded using the ControlDesk interfaced with dSPACE 1104 and a laboratory computer.

Figure 4B:
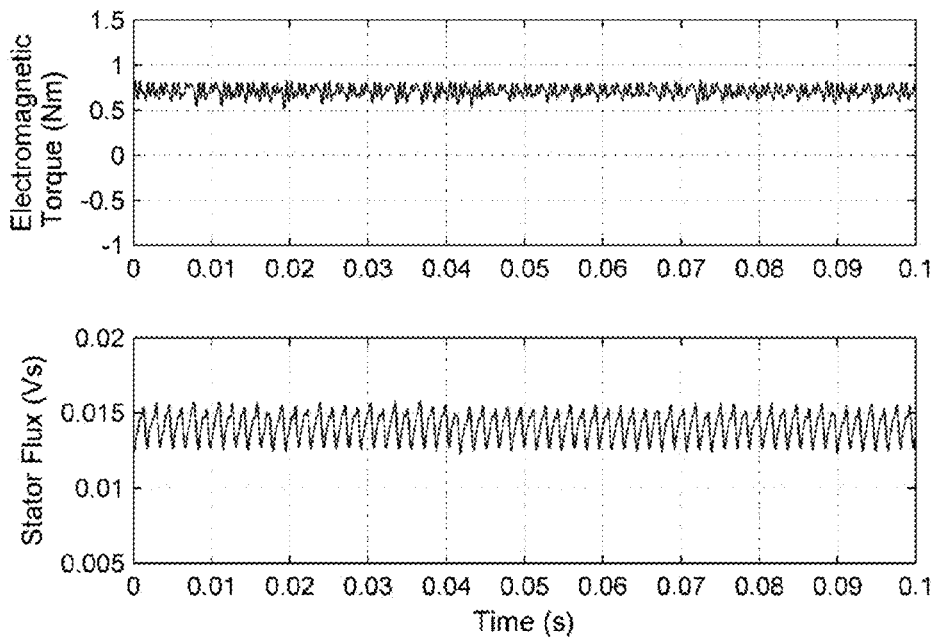
FIGS. 4B-4C are graphs depicting steady state responses generated from implementation of the experimental setup of FIG. 4A.
Figure 4C:
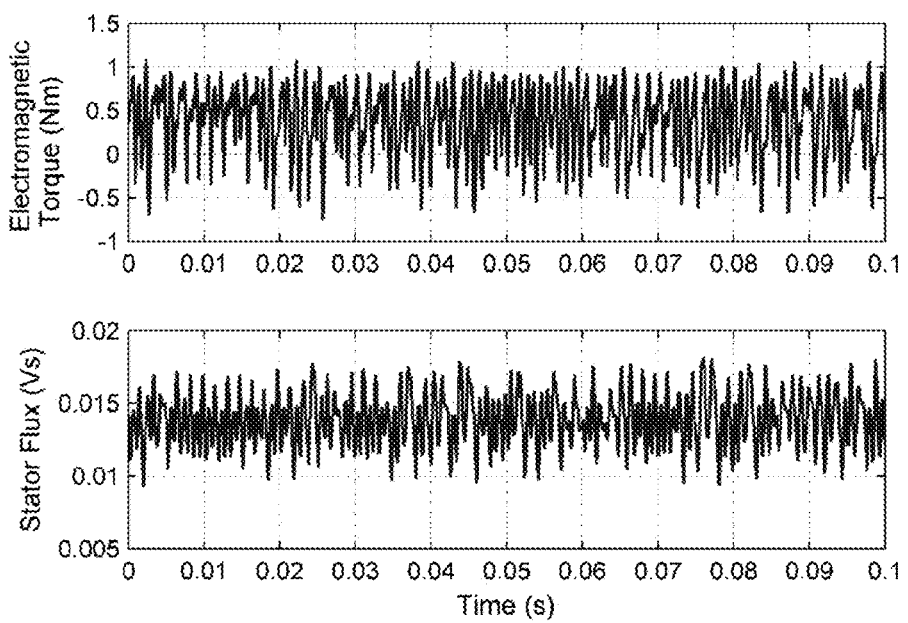
Figure 4D:
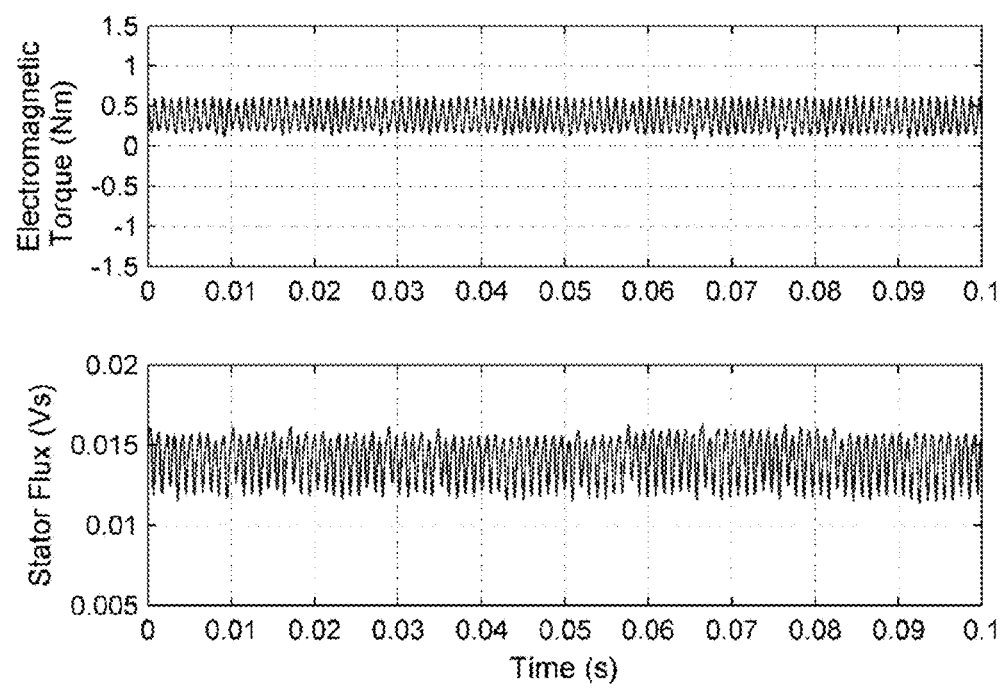
FIGS. 4D-4H are graphs depicting dynamic responses generated from implementation of the experimental setup of FIG. 4A.
Figure 4E:
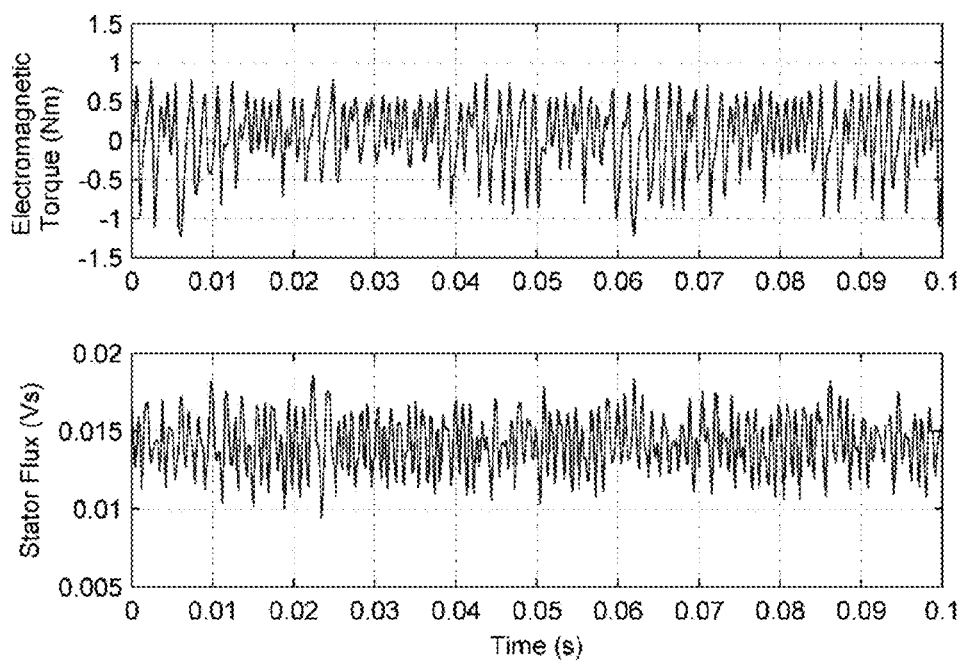

The steady-state performances of the saturation controller-based DTC and the hysteresis controller-based DTC are compared in FIGS. 4B-4E for two rotor speed conditions. In FIGS. 4B and 4C, the PMSM was operated at 1500 RPM. The commands of the stator flux linkage and torque, and the boundaries of the hysteresis and saturation controllers were the same as those in the simulation. The experimental results agreed with the simulation results. As shown in FIGS. 4B and 4C, the maximum peak-to-peak torque ripples of the saturation controller-based and hysteresis controller-based DTCs were 0.31 N·m and 1.2 N·m, respectively. The maximum peak-to-peak stator flux linkage ripples of the saturation controller-based and hysteresis controller-based DTCs were 0.0032 V·s and 0.0067 V·s, respectively. The average torques of the saturation controller-based DTC and the hysteresis controller-based DTC were 0.71 N·m and 0.5 N·m, respectively. When the rotor speed was increased to 2500 RPM and the torque command was changed to 0.5N·m, the maximum peak-to-peak torque ripples of the saturation controller-based and hysteresis controller-based DTCs were 0.475 N·m and 1.59 N·m, respectively, as shown in FIGS. 4D and 4E. The maximum peak-to-peak stator flux ripples of the saturation controller-based and hysteresis controller-based DTCs were 0.004V·s and 0.007 V·s, respectively. These results show that, as compared to the hysteresis controller-based DTC, the saturation controller-based DTC has reduced steady-state torque and stator flux ripples under various operating conditions.

Dynamic Response Experimental Study

Figure 4F:
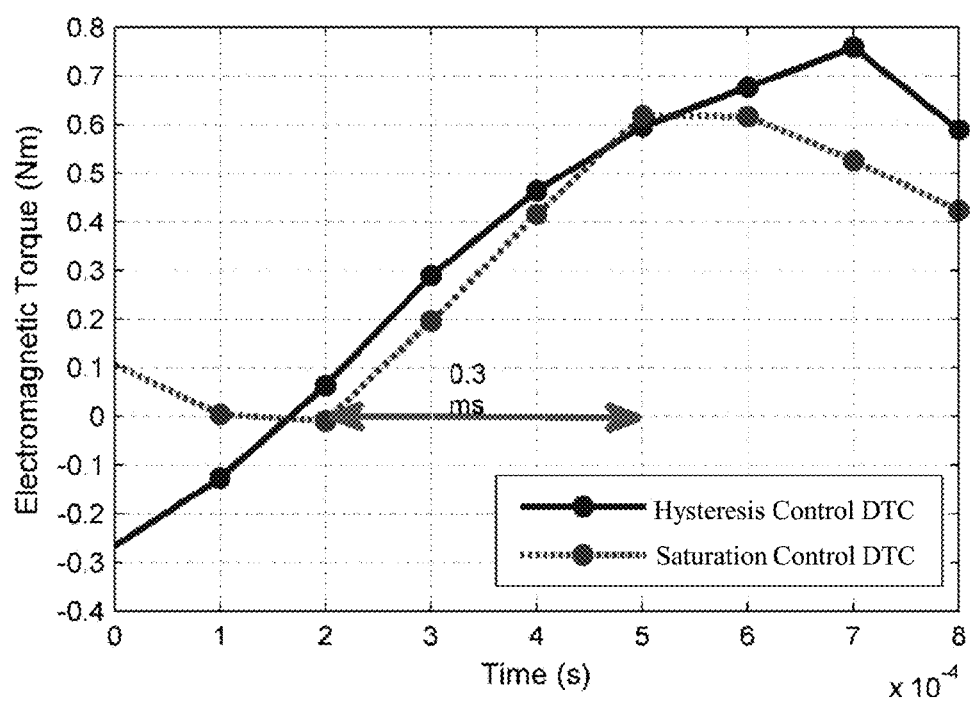

Using the control system shown in FIG. 4A, the dynamic responses of the hysteresis controller-based DTC scheme and the saturation controller-based DTC scheme were compared. In FIG. 4F, the torque command changed from 0 N·m to 0.5 N·m at 0.2 ms when the rotor speed is 2000 RPM. For the saturation controller-based DTC, the torque increased from −0.01 N·m to 0.62 N·m within 0.3 ms (3 switching cycles), and in that period the hysteresis controller-based DTC boosted the torque from 0.06 N·m to 0.6 N·m. Thus, the saturation controller-based DTC and the hysteresis controller-based DTC achieve equivalent dynamic performance.

Figure 4G:
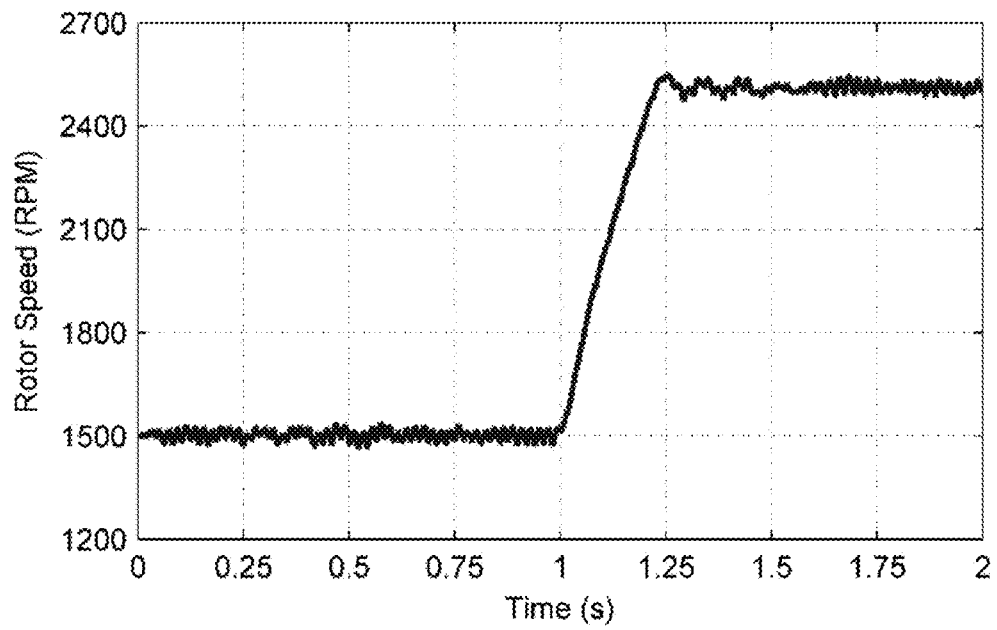
Figure 4H:
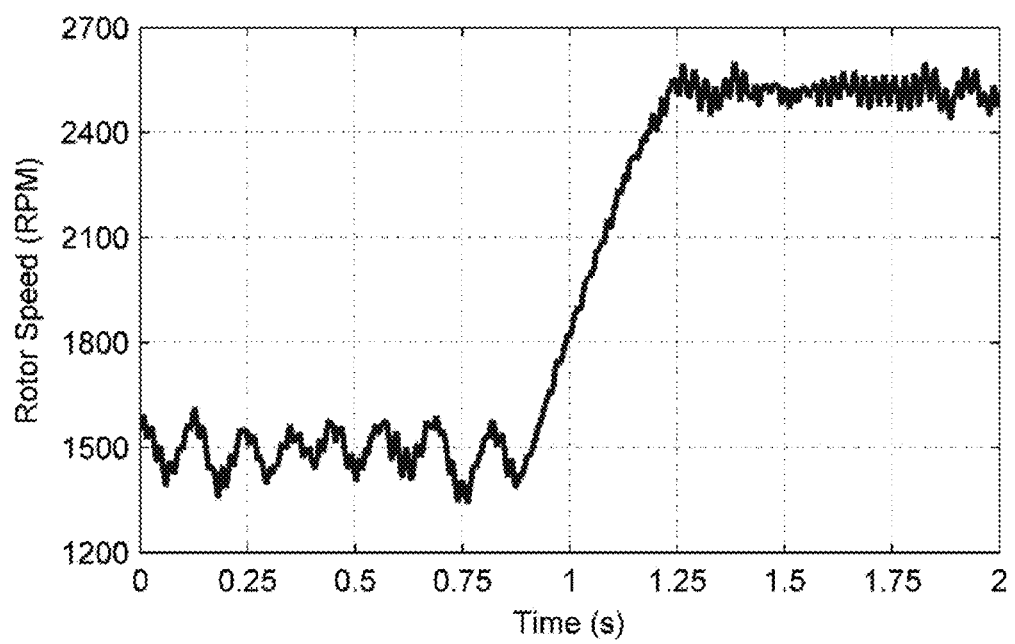

The dynamic responses of the saturation controller-based DTC and the hysteresis controller-based DTC were also tested when the PMSM drive system was in the speed control mode. In this mode, the torque command was generated by a PI controller which was driven by the rotor speed error. The speed command was 1500 RPM at the beginning and was changed to 2500 RPM at 1 s. The PI gains of the speed controller were $k_p$=0.2 and $k_i$=0.05, respectively. The torque command had an upper limit of 0.8 N·m and the load was 0.36 N·m. FIG. 4G shows the dynamic response of the rotor speed controlled by the saturation controller-based DTC scheme, and FIG. 4H shows the dynamic response of the rotor speed controlled by the hysteresis controller-based DTC scheme. The saturation controller-based DTC scheme had rotor speed ripples less than 36 RPM. The hysteresis controller-based DTC scheme had rotor speed ripples up to 120 RPM. Since the saturation controller-based DTC can generate larger mean torque than the hysteresis controller-based DTC, the settle down time of the rotor speed using the saturation controller-based DTC was approximately 0.25 s, which is 0.075 s faster than the hysteresis controller-based DTC.

Examples Comparing PWM Techniques

The following sections describe simulations and experiments that measure the performance of the PWM techniques described herein, in particular, CPWM when ($\mu$=0.5), DPWMMIN (when $\mu$=1), DPWMMAX (when $\mu$=0), DPWM (when $\mu$=1 for sectors 1, 3 and 5 and $\mu$=0 for sectors 2, 4 and 6). These techniques are implemented using the DTC system 200 depicted in FIG. 2A. The effectiveness of the PWM schemes is verified by simulation and experimental results on a 200-W PMSM drive The four approaches generate four different PWM waveforms, i.e., DPWMMIN, DPWMMAX, DPWM, and CPWM, in each control cycle of the DTC system. The performance of the four zero-voltage-vector-selection approaches is evaluated by simulation studies in MAT-LAB®/Simulink® and experimental studies on a 200-W salient-pole PMSM drive system. Results show that the CPWM scheme had lower torque ripple, less steady-state torque error, and lower stator current total harmonic distortion (THD). The number of switching actions in one electrical revolution in the CPWM scheme was usually higher than that in the DPWM scheme.

Computational Simulations

Simulation studies were carried out in MATLAB®/Simulink® to evaluate the saturation controller-based DTC system with the proposed four different zero voltage vector selection schemes for a 200-W salient-pole PMSM drive system. The parameters of the PMSM were as follows:
the maximum speed is 3000 rpm;
R=0.235Ω;
$L_d$=0.275 mH;
$L_q$=0.364 mH;
the voltage constant $K_e$=9.7 V/krpm;
the number of pole pairs is p=4;
the momentum of inertia is J=0.000007 kg·m2;
the DC bus voltage of the inverter is 41.75 V; and
the sampling frequency is 10 kHz.
The boundaries of the torque and stator flux saturation functions and the hysteresis comparator were 0.3 N·m and 0.003 V·s, respectively. The steady-state performances of the four zero voltage vector selection schemes were compared for the PMSM operating at 1500 rpm, where the commands of the torque and the stator flux magnitude were 0.75 N·m and 0.0135 V·s, respectively.

Figure 5A:
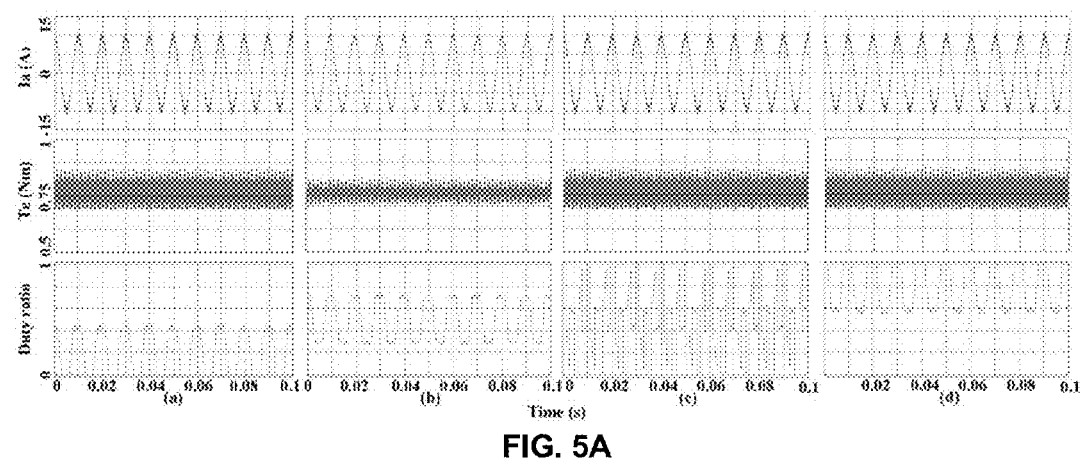
FIG. 5A shows graphs depicting simulated steady state responses of several PWM schemes over several switching periods for a saturation controller-based DTC system.

The stator current, torque magnitude, and duty ratio of the system using the four zero voltage vector selection schemes are compared in FIG. 5A, which shows these parameters over several modulation cycles, e.g., several switching periods. Panel (a) of FIG. 5A shows the stator current, torque magnitude, and duty ratio of the DTC system implementing the DPWMMIN scheme. Panel (b) of FIG. 5A shows the stator current, torque magnitude, and duty ratio of the DTC system implementing the CPWM scheme. Panel (c) of FIG. 5A shows the stator current, torque magnitude, and duty ratio of the DTC system implementing the DPWM scheme. Panel (d) of FIG. 5A shows the stator current, torque magnitude, and duty ratio of the DTC system implementing the DPWMMAX scheme.

The steady-state torque error, torque ripples, THD of stator phase current, and switching frequency of the four schemes are compared in TABLE 6.

TABLE 6

Steady-State Performance of DPWMMIN, CPWM, DPWM, and DPWMMAX schemes

| Performance metric | DPWMMIN | CPWM | DPWM | DPWM-MAX |
|---|---|---|---|---|
| Steady-state torque error (N · m) | 0.0220 | 0.0102 | 0.0198 | 0.0166 |
| Torque ripple (N · m) | 0.0391 | 0.0217 | 0.0390 | 0.0379 |
| THD of stator phase current (%) | 6.00 | 3.98 | 5.91 | 6.13 |
| $f_{av}$ (kHz) | 6.7 | 10 | 6.7 | 6.7 |

The average switching frequency, $f_{av}$, was calculated using $f_{av}$=NT/T, where NT is the total number of switching times of one IGBT switch of the inverter during a fixed period T, which was 0.01 s in the simulation. As shown in FIG. 5A and TABLE 6, the CPWM achieved the lowest torque ripple, least steady-state torque error, and lowest stator current THD. The switching frequency of the CPWM was higher than the other three schemes.

Figure 5B:
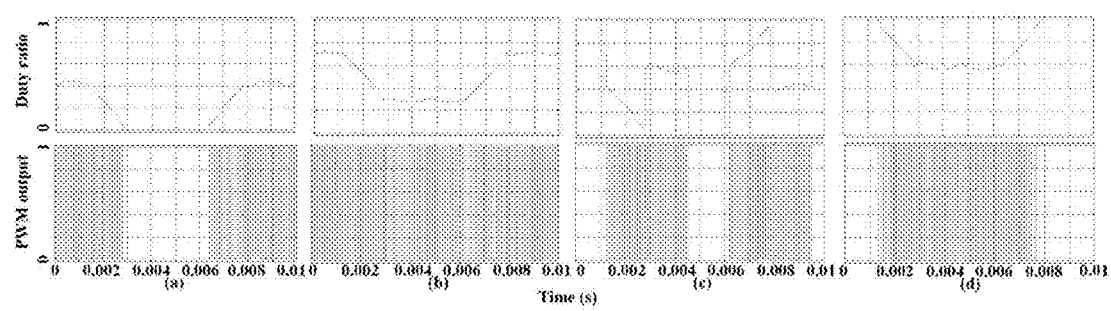
FIG. 5B shows graphs depicting steady state responses of several PWM schemes over a single switching period for a saturation controller-based DTC system.
Figure 5C:
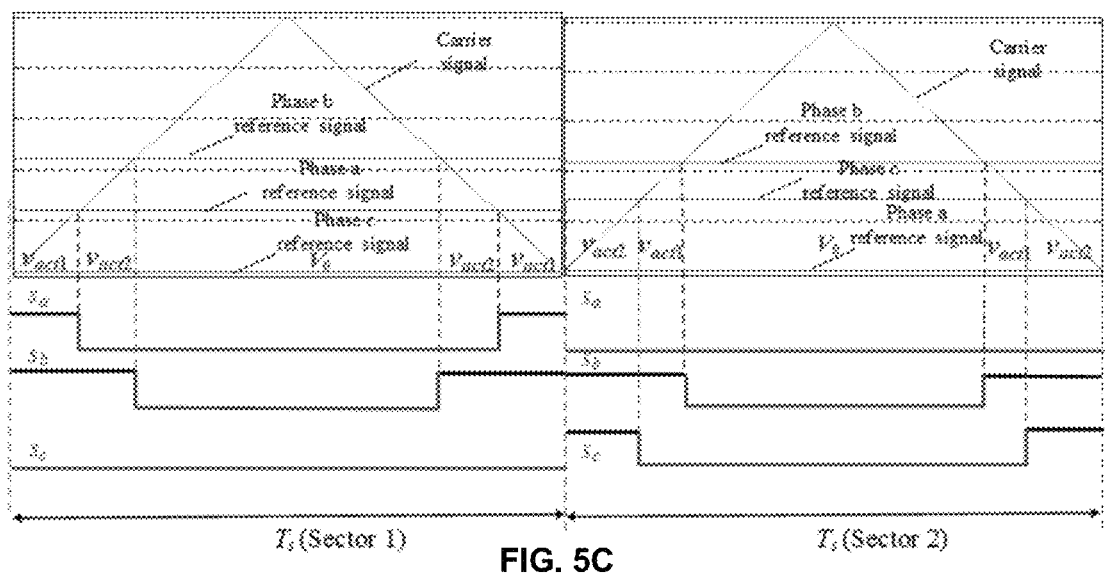
FIGS. 5C-5F are diagrams depicting example PWM output waveforms for a saturation controller-based DTC system.
Figure 5D:
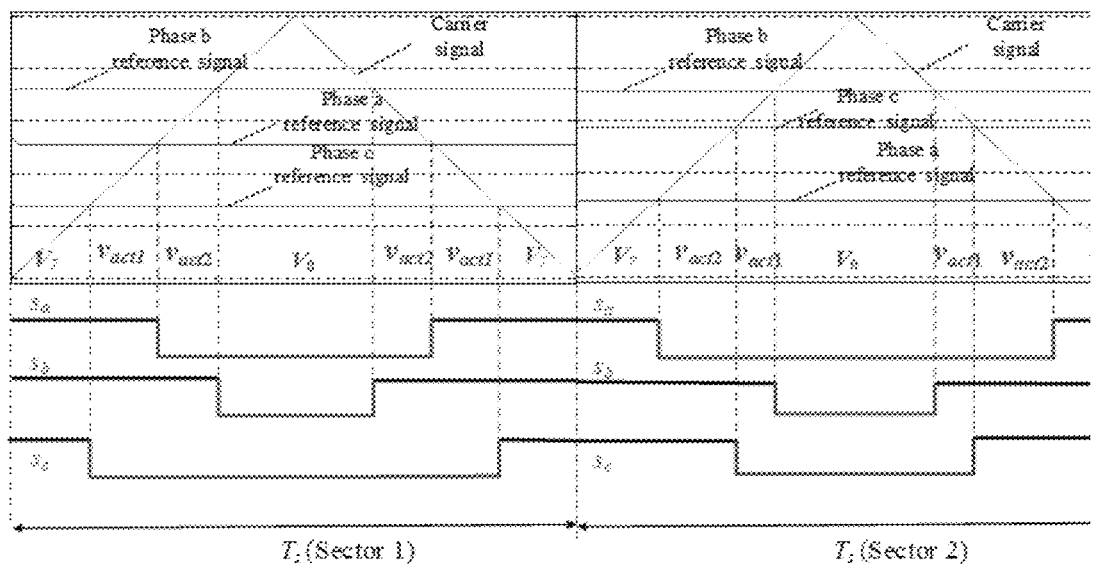
Figure 5E:
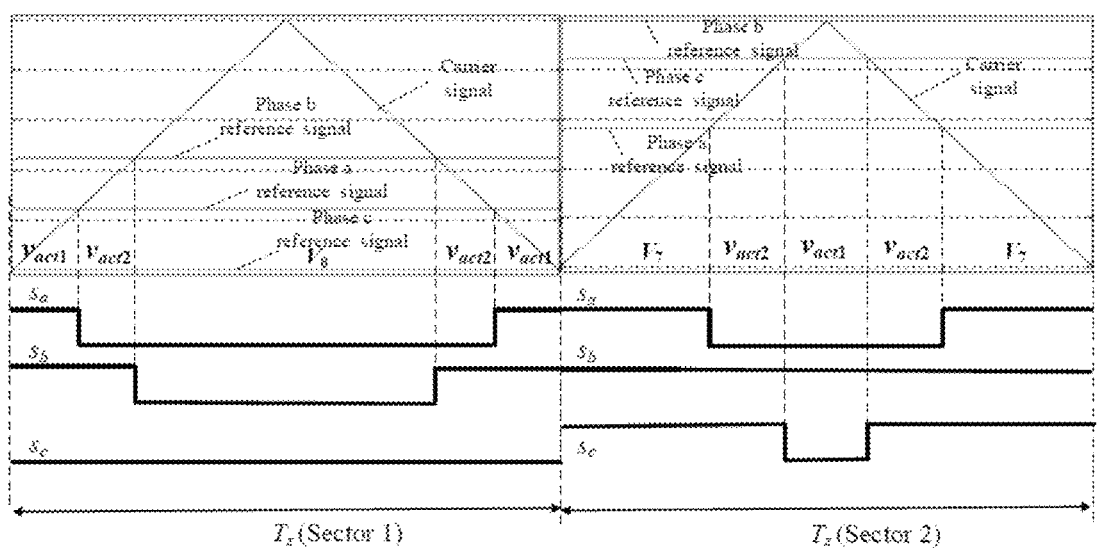
Figure 5F:
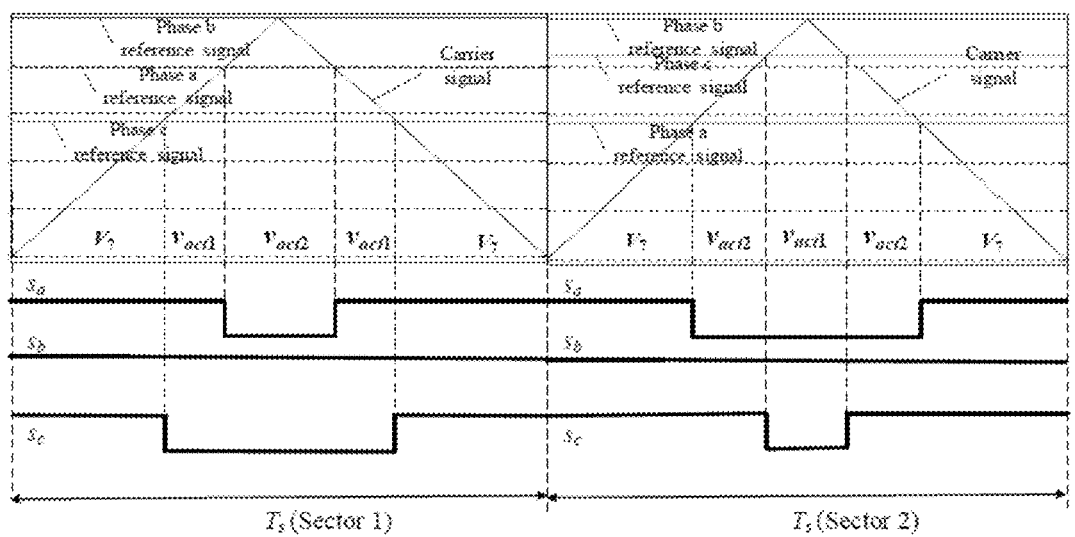

The duty ratio d and the PWM output waveforms were also compared. FIG. 5B compares the duty ratio d and PWM output waveforms of phase-a leg of the inverter in one modulation cycle, e.g., a single switching period, of each of the four simulated schemes. The modulation cycle was 0.1 s in the simulation. Panel (a) of FIG. 5B shows the duty ratio d and PWM output waveform of the DTC system implementing the DPWMMIN scheme. Panel (b) of FIG. 5B shows the duty ratio d and PWM output waveform of the DTC system implementing the CPWM scheme. Panel (c) of FIG. 5B shows the duty ratio d and PWM output waveform of the DTC system implementing the DPWM scheme. Panel (d) of FIG. 5B shows the duty ratio d and PWM output waveform of the DTC system implementing the DPWM-MAX scheme.

FIG. 5C-5F schematically depict simulations of the PWM output waveforms $S_a$, $S_b$, and $S_c$ of the three inverter legs for each of the four different PWM schemes. The PWM output waveforms $S_a$, $S_b$, and $S_c$ correspond to phases a, b, and c, respectively, of the inverter. FIGS. 5C-5F correspond to the waveforms of the DPWMMIN, CPWM, DPWM, and DPWMMAX schemes, respectively. The left panel in each of FIGS. 5C-5F show the switching cycle when the stator flux linkage $\psi_s$ is in located in sector 1, and the right panel in each of FIGS. 5C-5F show the switching cycle when the stator flux linkage $\psi_s$ is located in sector 2. Each of FIGS. 5C-5F shows the reference signals for each of phase a, phase b, and phase c, as well as the carrier signal transmitted from the motor controller (e.g., the motor controller 215). FIGS. 5C-5F further depict when each of the vectors is activated during the switching cycle, with $v_{act1}$, $v_{act2}$ corresponding to the active vectors noted in the switching table of TABLE 3.

Experimental Results Experimental studies were carried out to further evaluate the three zero voltage vector selection schemes for the 200-W PMSM drive system used in the simulation studies. The control algorithms were implemented in a dSPACE 1104 real-time control system with a sampling period of 100 μs. The dead time was set as 1 μs. The hardware setup of the experimental system is schematically depicted in FIG. 4A. Experiments were performed on the system at the same operating condition evaluated in the simulation studies described herein comparing the various zero voltage vector selection schemes.

Figure 5G:
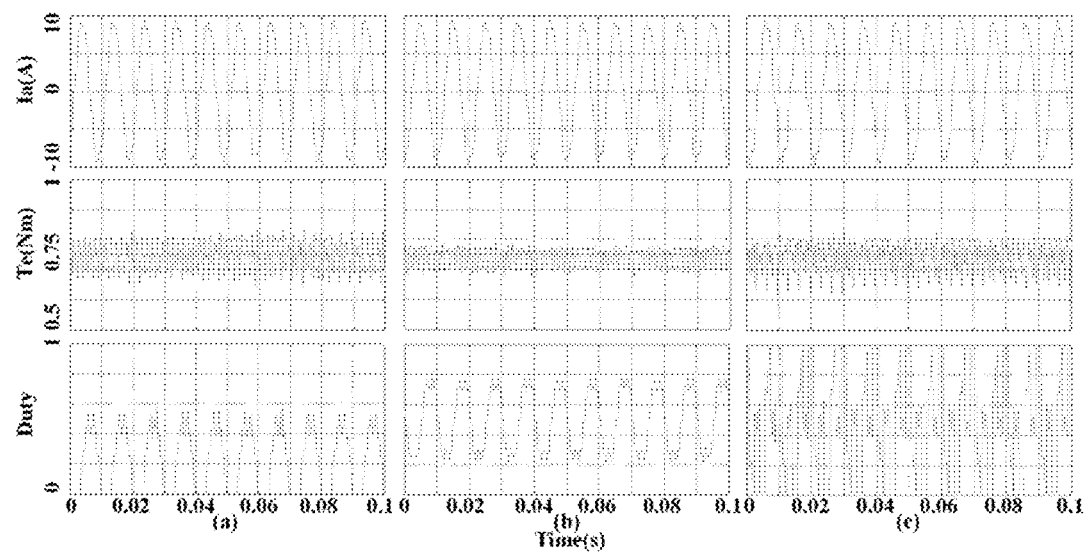
FIG. 5G shows graphs depicting experimental steady state responses of several PWM schemes over several switching periods for a saturation controller-based DTC scheme.

Results are shown in FIG. 5G and Table 7. Panel (a) of FIG. 5G shows the stator current, torque magnitude, and duty ratio of the DTC system implementing the DPWMMIN scheme. Panel (b) of FIG. 5G shows the stator current, torque magnitude, and duty ratio of the DTC system implementing the CPWM scheme. Panel (c) of FIG. 5G shows the stator current, torque magnitude, and duty ratio of the DTC system implementing the DPWM scheme. The experimental results were similar to those of the computational simulations presented herein. The CPWM implementation achieved lower torque ripple, steady-state torque error, and stator current THD. The CPWM scheme also resulted in a higher switching frequency than the other two schemes.

TABLE 7

Steady-State Performance of the DPWMMIN, CPWM, DPWM Schemes

| Performance metric | DPWMMIN | CPWM | DPWM |
| --- | --- | --- | --- |
| Steady-state torque error (N · m) | 0.0080 | 0.0057 | 0.0132 |
| Torque ripple (N · m) | 0.0280 | 0.0134 | 0.0337 |
| THD of stator phase current (%) | 5.82 | 3.45 | 5.64 |
| $f_{av}$ (kHz) | 6.7 | 10 | 6.7 |

The DTC system 200 has many applications, such as for use in driving motors in electric vehicles and industrial motors. Other applications include AC machines in home appliances, military manned/unmanned platforms and systems, wind energy conversion systems, offshore platforms, and robotics, etc. For these various applications and systems, the DTC system 200 can be used to control a speed or acceleration of the motors.

Various components or modules of the DTC system 200 and the motor controller 215, such as the torque and stator flux estimator 210, the switching table 208, the saturation controllers 204 and 206, the torque comparator 205, the duty ratio modulator 209, and summers that generate the torque error and the stator flux error, can be implemented in hardware, software, firmware, or a combination of the above. The components or modules can be implemented using discrete components or integrated circuits. Various components or modules of the DTC system 200 can be implemented using one or more data processors (e.g., general purpose processors or digital signal processors), in combination with one or more data storages that store instructions to be executed by the one or more data processors for implementing the various functions of the DTC system 200, such as performing calculations according to various equations described above. The data storages can be computer-readable mediums (e.g., RAM, ROM, SDRAM, hard disk, optical disk, and flash memory). The one or more processors can execute instructions to implement the functions performed by the modules of DTC system 200. The modules can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. In some cases, the actions recited in the claims can be performed in a different order and still achieve desirable results.

A number of implementations have been described. Nevertheless, it will be understood that various modifications may be made without departing from the spirit and scope of the invention. For example, the saturation controllers 204 and 206 can map the input x to the output s according to various functions. For example, when the input x is between the lower and upper boundaries, the relationship between the input x and the output s does not necessarily have to be linear, but can also be based on, e.g., a piecewise linear function, a Sigmoid function, or other functions.

While the inverter 114 and the inverter 214 have been described as two-level three-phase inverters, in some examples, the inverter 214 can have a single phase, two phases, or greater than four phases. In such cases, the switching table can include the appropriate number of entries based on the number of available switching states of the inverter.

While the DTC systems 100, 200 have been described as including an inverter, in some examples, instead of an inverter, the DTC systems 100, 200 include an analog AC output device that provides currents and voltage to the motor. The AC output device can be, for example, a power supply that receives the control signals delivered by the motor controllers 115, 215 and supplies a predetermined voltage and current based on the control signals.

With respect to the DTC system 200, while the normalized discrete states for the saturation controllers 204, 206 have been described to be 0 and 1, these values may differ depending on the application. For example, in some implementations, the discrete states can be −1 and 1. In some examples, the output value from the saturation controllers 204, 206 between the discrete states can be linearly proportional to the input error. For example, as described herein, the output value linearly increases as the input value varies from the lower boundary $-B_w$ to the upper boundary $B_w$. In some cases, instead of linearly varying with the input error, the output value can vary with the input error in accordance to a logistic function, an exponential function, a combination of several step functions, or other function in which the output value varies between a low value and a high value as the input value varies between the lower boundary $-B_w$ and the upper boundary $B_w$.

While one example of a DPWM scheme is described as corresponding to when $\mu=1$ for sectors 1, 3 and 5 and $\mu=0$ for sectors 2, 4 and 6, the DPWM scheme can include values for the weighting factor $\mu$ that are between 0 and 1, for example, between 0.1 and 0.5, or between 0.5 and 0.9. In some implementations, a different value for the weighting factor $\mu$ is assigned to each sector.

In other implementations of the DTC system, a combination of saturation and hysteresis controllers can be used to deliver inputs to the duty ratio modulator. For example, the torque error can be fed into a saturation controller while the flux error can be fed into a hysteresis controller. The output from those controller can then be delivered to the duty ratio modulator, which adopts a modified duty ratio equation to determine the duty ratio vector.

Accordingly, other implementations are within the scope of the following claims.

What is claimed is:

1. An apparatus comprising:
    a motor controller to generate control signals to control an electric motor, the motor controller comprising
        a first saturation controller to generate a first saturation controller output based on feedback signals associated with the electric motor, and
        a duty ratio modulator coupled to the first saturation controller, the duty ratio modulator being configured to determine activation times for a set of voltage vectors based on the first saturation controller output,
    wherein the motor controller is configured to generate, at each switching cycle, a control signal based on the set of voltage vectors and the activation times for the set of voltage vectors, and provide the control signal for controlling the electric motor.

2. The apparatus of claim 1, further comprising the electric motor.

3. The apparatus of claim 2, wherein the electric motor is an alternating current motor.

4. The apparatus of claim 1, wherein the first saturation controller is configured to generate the first saturation controller output based on a difference between an estimated torque of the electric motor and a reference torque.

5. The apparatus of claim 1 in which the duty ratio modulator is configured to determine the activation times for the set of voltage vectors based on a hysteresis controller output and the first saturation controller output.

6. The apparatus of claim 1 in which the feedback signals are representative of a voltage and a current applied to the electric motor.

7. The apparatus of claim 1, wherein the motor controller comprises a switching table containing sets of voltage vectors, the switching table being configured to select the set of voltage vectors based on the feedback signals.

8. The apparatus of claim 7, wherein the motor controller further comprises a hysteresis controller configured to generate a hysteresis controller output based on the feedback signals, and the switching table is configured to select the set of voltage vectors based on the hysteresis controller output.

9. The apparatus of claim 7, further comprising an estimator to estimate a torque of the electric motor and a stator flux of the electric motor based on the feedback signals, wherein the switching table is configured to select the set of voltage vectors based on a position of the stator flux within a sector of a stationary reference frame.

10. The apparatus of claim 1, wherein the set of vectors comprises at least two active vectors.

11. The apparatus of claim 1, wherein the set of vectors comprises at least one passive vector.

12. The apparatus of claim 1, wherein the set of vectors comprises at least two passive vectors.

13. The apparatus of claim 12, wherein the duty ratio modulator is configured to select a first activation time of a first passive vector and a second activation time of a second passive vector based on a predetermined weighting factor.

14. The apparatus of claim 1, wherein:
    the motor controller comprises a second saturation controller to generate a second saturation controller output based on the feedback signals, and
    the duty ratio modulator is further connected to the second saturation controller, the duty ratio modulator being configured to determine the activation times for the set of voltage vectors based on the first saturation controller output and the second saturation controller output.

15. The apparatus of claim 14, wherein the second saturation controller is configured to generate the second saturation controller output based on a difference between an estimated stator flux of the electric motor and a reference stator flux.

16. The apparatus of claim 1, further comprising an inverter coupled to the electric motor, wherein the motor controller is configured to apply the control signal to the inverter to place the inverter in one of a plurality of inverter states, each inverter state corresponding to one voltage vector among the set of voltage vectors, and the inverter being in each inverter state for a corresponding activation time.

17. The apparatus of claim 1, wherein the first saturation controller is configured such that available values of the first saturation controller output include a low state, a high state, and a range of states between the low state and the high state.

18. The apparatus of claim 17, wherein the first saturation controller is configured such that a value of the first saturation controller output corresponds to
    the low state if a value of the feedback signals is less than a first predefined threshold,
    the high state if the value of the feedback signals is greater than a second predefined threshold, and a state in the range of states if the value of the feedback signals is between the first predefined threshold and the second predefined threshold.

19. The apparatus of claim 1, wherein:
the duty ratio modulator is configured to, for each switching cycle, determine a first percentage of a switching period of a switching cycle to activate a first vector of the set of vectors and a second percentage of the switching period to activate a second vector of the set of vectors, the first and second percentages being proportional to a value of the first saturation controller output, and
the motor controller is configured to generate the control signal to activate the first vector for the first percentage of the switching period and to activate the second vector for the second percentage of the switching period.

20. A method of controlling an electric motor system, the method comprising:
determining activation times for a set of voltage vectors based on a first saturation controller output; and
generating, at each switching cycle, a control signal to control an electric motor based on the set of voltage vectors and the activation times for the set of voltage vectors.

21. The method of claim 20, further comprising generating the first saturation controller output based on a difference between an estimated torque of the electric motor and a reference torque.

22. The method of claim 20, wherein generating the control signal to control the electric motor comprises causing an alternating current to be delivered to the electric motor.

23. The method of claim 20, further comprising:
receiving feedback signals indicative of a voltage and a current applied to the electric motor, and
generating the first saturation controller output based on the feedback signals.

24. The method of claim 23, further comprising selecting the set of voltage vectors from predefined sets of voltage vectors based on the feedback signals.

25. The method of claim 24, further comprising estimating a torque and a stator flux based on the feedback signals, and
wherein selecting the set of voltage vectors comprises selecting the set of voltage vectors based on a position of the stator flux within a sector of a stationary reference frame.

26. The method of claim 23, further comprising generating a hysteresis controller output based on the feedback signals,
wherein selecting the set of voltage vectors comprises selecting the set of voltage vectors based on the hysteresis controller output.

27. The method of claim 20, wherein the set of vectors comprises at least two active vectors.

28. The method of claim 20, wherein the set of vectors comprises at least one passive vector.

29. The method of claim 20, wherein the set of vectors comprises at least two passive vectors.

30. The method of claim 20, wherein determining activation times for the set of voltage vectors comprises determining a first activation time of a first passive vector and a second activation time of a second passive vector based on a predetermined weighting factor.

31. The method of claim 20, wherein determining activation times comprises determining the activation times for the set of voltage vectors based on the first saturation controller output and a second saturation controller output.

32. The method of claim 31, further comprising generating the second saturation controller output based on a difference between an estimated stator flux of the electric motor and a reference stator flux.

33. The method of claim 20, further comprising applying the control signal to an inverter to place the inverter in one of a plurality of inverter states, each inverter state corresponding to one voltage vector among the set of voltage vectors, and the inverter being in each inverter state for a corresponding activation time.

34. The method of claim 20, wherein available values of the first saturation controller output include a low state, a high state, and a range of states between the low state and the high state.

35. The method of claim 34, wherein a value of the first saturation controller output corresponds to
the low state if a value of feedback signals from the electric motor is less than a first predefined threshold,
the high state if the value of the feedback signals is greater than a second predefined threshold, and
a state in the range of states if the value of the feedback signals is between the first predefined threshold and the second predefined threshold.

36. The method of claim 20, wherein:
determining the activation times comprises determining a first percentage of a switching period of a switching cycle to activate a first vector of the set of vectors and a second percentage of the switching period to activate a second vector of the set of vectors, the first and second percentages being proportional to a value of the first saturation controller output, and
generating the control signal at each switching cycle comprises generating the control signal to activate the first vector for the first percentage of the switching period and to activate the second vector for the second percentage of the switching period.

37. An apparatus comprising:
a motor controller to generate control signals to control an electric motor, the motor controller comprising:
a torque and stator flux estimator to estimate, based on a feedback current and a feedback voltage associated with the electric motor, an estimated torque and an estimated stator flux of the electric motor,
a first saturation controller that receives a torque error representing a difference between the estimated torque and a reference torque and generates a first saturation controller output based on the torque error, and
a second saturation controller that receives a flux error representing a difference between the estimated stator flux and a reference stator flux, and generates a second saturation controller output based on the flux error,
wherein, at each switching cycle, the motor controller generates a control signal based at least on the first saturation controller output, the second saturation controller output, and a plurality of voltage vectors, and provides the control signal for controlling the electric motor.

38. The apparatus of claim 37, further comprising the electric motor.

39. The apparatus of claim 38, wherein the electric motor is an alternating current motor.

40. The apparatus of claim 37, wherein the plurality of voltage vectors comprise a zero voltage vector and a plurality of active voltage vectors.

41. The apparatus of claim 40, wherein the plurality of voltage vectors comprise a plurality of zero voltage vectors.

42. The apparatus of claim 40, wherein the motor controller modulates an output voltage based on a duty ratio vector that is a linear combination of the zero voltage vector and the plurality of active voltage vectors.

43. The apparatus of claim 42, wherein coefficients of the linear combination are determined from the first saturation controller output and the second saturation controller output, and elements of the duty ratio vector correspond to activation times of the zero voltage vector and the plurality of active voltage vectors.

44. The apparatus of claim 37, wherein the motor controller comprises a torque comparator that receives the torque error and generates a torque comparator output, the torque comparator output having a low state or a high state.

45. The apparatus of claim 44, wherein, if the torque comparator output has the low value, the plurality of voltage vectors are configured to cause the torque of the electric motor to be decreased.

46. The apparatus of claim 44, wherein, if the torque comparator output has the high value, the plurality of voltage vectors are configured to cause the torque of the electric motor to be increased.

47. The apparatus of claim 44, wherein the motor controller is configured to select a table entry from a table based on the torque comparator output, the table having a plurality of table entries each having a set of voltage vectors, and at least one of the table entries corresponding to the plurality of voltage vectors.

48. The apparatus of claim 47, wherein the estimated stator flux is located within a sector of a stationary reference frame, and the motor controller selects the table entry based on the sector within which the estimated stator flux is located.

49. The apparatus of claim 48, wherein the stationary reference frame comprises six sectors defined by the plurality of voltage vectors.

50. The apparatus of claim 48, wherein the motor controller selects the table entry from one of twelve available table entries.

51. The apparatus of claim 37, wherein the first saturation controller output increases linearly from a low value to a high value as the torque error increases.

52. The apparatus of claim 51, wherein the first saturation controller output is normalized such that the low value is zero and the high value is one.

53. The apparatus of claim 37, wherein the second saturation controller output linearly increases from a low value to a high value as the stator flux error increases.

54. The apparatus of claim 53, wherein the second saturation controller output is normalized such that the low value is zero and the high value is one.

55. The apparatus of claim 37, wherein the motor controller delivers the control signals to an inverter operable with the electric motor.

56. The apparatus of claim 37, wherein a low value of the first saturation controller output is determined based on a rotor speed of the electric motor.

57. The apparatus of claim 37, wherein a low value of the second saturation controller output is set such that a magnitude of the estimated stator flux is substantially constant.

58. An electric vehicle that comprises the electric motor and the motor controller of claim 37.

59. An industrial motor drive system that comprises the electric motor and the motor controller of claim 37.

60. The apparatus of claim 37, wherein:
the first saturation controller is configured such that available values of the first saturation controller output include a low state, a high state, and a range of states between the low state and the high state, and
the second saturation controller is configured such that available values of the second saturation controller output include a low state, a high state, and a range of states between the low state and the high state.

61. The apparatus of claim 60, wherein the first saturation controller is configured such that a value of the first saturation controller output corresponds to
the low state if a value of the torque error is less than a first predefined threshold,
the high state if the value of the torque error is greater than a second predefined threshold, and
a state in the range of states if the value of the torque error is between the first predefined threshold and the second predefined threshold.

62. The apparatus of claim 37, wherein:
the motor controller is configured to, for each switching cycle,
determine a first percentage of a switching period of a switching cycle to activate a first vector of the plurality of vectors and a second percentage of the switching period to activate a second vector of the plurality of vectors, the first and second percentages being proportional to a value of the first saturation controller output, and
generate the control signal to activate the first vector for the first percentage of the switching period and to activate the second vector for the second percentage of the switching period.

63. A method of controlling an electric motor system, comprising:
estimating, based on a feedback current and a feedback voltage from an electric motor of the electric motor system, an estimated torque and an estimated stator flux;
generating a first saturation controller output based on a torque error representing a difference between the estimated torque and a reference torque;
generating a second saturation controller output based on a flux error representing a difference between the estimated stator flux and a reference stator flux; and
generating, at each switching cycle, a control signal to control the electric motor based at least on the first saturation controller output, the second saturation controller output, and a plurality of voltage vectors to apply to the electric motor.

64. The method of claim 63, wherein generating the control signal to control the electric motor comprises causing an alternating current to be delivered to the electric motor.

65. The method of claim 63, wherein the plurality of voltage vectors comprises a zero voltage vector and a plurality of active voltage vectors.

66. The method of claim 65, wherein the plurality of voltage vectors comprise a plurality of zero voltage vectors.

67. The method of claim 65, further comprising modulating an output voltage based on a duty ratio vector that is a linear combination of the zero voltage vector and the plurality of active voltage vectors.

68. The method of claim 67, wherein coefficients of the linear combination are determined from the first saturation controller output and the second saturation controller output, and elements of the duty ratio vector correspond to activation times of the zero voltage vector and the plurality of active voltage vectors.

69. The method of claim 63, further comprising generating a torque comparator output based on the torque error, the torque comparator output having a low state and a high state.

70. The method of claim 69, wherein, if the torque comparator output is a low value, the plurality of voltage vectors are configured to cause the torque of the electric motor to be decreased.

71. The method of claim 69, wherein, if the torque comparator output is a high value, the plurality of voltage vectors are configured to cause the torque of the electric motor to be increased.

72. The method of claim 69, further comprising selecting a table entry from a table based on the torque comparator output, the table having a plurality of table entries each having a set of voltage vectors, and at least one of the tables entries corresponding to the plurality of voltage vectors.

73. The method of claim 72, further comprising selecting the table entry based on a sector of a stationary reference frame within which the estimated stator flux is located.

74. The method of claim 73, wherein the stationary reference frame comprises six sectors defined by the plurality of voltage vectors.

75. The method of claim 73, wherein the table entry is selected from among twelve available table entries.

76. The method of claim 63, wherein the first saturation controller output increases linearly from a low value to a high value as the torque error increases.

77. The method of claim 76, wherein the first saturation controller output is normalized such that the low value is zero and the high value is one.

78. The method of claim 63, wherein the second saturation controller output linearly increases from a low value to a high value as the stator flux error increases.

79. The method of claim 78, wherein the second saturation controller output is normalized such that the low value is zero and the high value is one.

80. The method of claim 63, further comprising delivering the control signals to an inverter operable with the electric motor.

81. The method of claim 63, wherein a low value of the first saturation controller output is determined based on a rotor speed of the electric motor.

82. The method of claim 63, wherein a low value of the second saturation controller output is set such that a magnitude of the estimated stator flux is substantially constant.

83. The method of claim 63, wherein the electric motor is an electric motor of an electric vehicle, and the method comprises controlling the electric motor to control a speed or acceleration of the electric vehicle.

84. The method of claim 63, wherein the electric motor is part of an industrial motor drive system.

85. The method of claim 63, wherein:
available values of the first saturation controller output include a low state, a high state, and a range of states between the low state and the high state, and
available values of the second saturation controller output include a low state, a high state, and a state between the low state and the high state.

86. The method of claim 85, wherein a value of the first saturation controller output corresponds to
the low state if a value of the torque error from the electric motor is less than a first predefined threshold,
the high state if the value of the torque error is greater than a second predefined threshold, and
a state in the range of states if the value of the torque error is between the first predefined threshold and the second predefined threshold.

87. The method of claim 63, wherein:
determining the activation times comprises determining a first percentage of a switching period of a switching cycle to activate a first vector of the plurality of vectors and a second percentage of the switching period to activate a second vector of the plurality of vectors, the first and second percentages being proportional to a value of the first saturation controller output, and
generating the control signal at each switching cycle comprises generating the control signal to activate the first vector for the first percentage of the switching period and to activate the second vector for the second percentage of the switching period.

88. An apparatus comprising:
an electric motor; and
a controller means for generating control signals to control the electric motor, the controller means comprising:
means for estimating, based on a feedback current and a feedback voltage from the electric motor, an estimated torque and an estimated stator flux of the electric motor,
means for receiving a torque error representing a difference between the estimated torque and a reference torque, and generating a first saturation controller output based on the torque error, and
means for receiving a flux error representing a difference between the estimated stator flux and a reference stator flux, and generating a second saturation controller output based on the flux error,
wherein the control signals are generated based at least on the torque error, the flux error, and a table entry selected from a switching table containing information on a plurality of voltage vectors to apply to the electric motor.

89. The apparatus of claim 88, wherein:
the first saturation controller is configured such that available values of the first saturation controller output include a low state, a high state, and a range of states between the low state and the high state, and
the second saturation controller is configured such that available values of the second saturation controller output include a low state, a high state, and a state between the low state and the high state.

90. The apparatus of claim 89, wherein the means for receiving the torque error and generating the first saturation controller output is configured such that a value of the first saturation controller output corresponds to
the low state if a value of the torque error is less than a first predefined threshold,
the high state if the value of the torque error is greater than a second predefined threshold, and
a state in the range of states if the value of the torque error is between the first predefined threshold and the second predefined threshold.

91. The apparatus of claim 88, wherein the control signals are generated to activate a first vector of the plurality of vectors for a first percentage of a switching period and to activate a second vector of the plurality of vectors for a second percentage of the switching period, the first and second percentages being proportional to a value of the first saturation controller output.

* * * * *